United States Patent [19]
Espenschied et al.

[11] 3,756,358
[45] Sept. 4, 1973

[54] INTERRELATED CONTROLS FOR GEARING, CLUTCH, BRAKES AND ENGINE

[75] Inventors: Helmut Espenschied, Ludwigsburg-Pflugf; Volker Kadelbach, Heutingsheim; Georg Rothfuss, Ditzingen; Hans Scheyhing, Hofingen; Bernard Mattes, Ludwigsburg; Rainer Burkel; Ernst Erben, both of Schwieberdingen; Karl-Otto Hupfeld, Moglingen; Herbert Weyer, Stuttgart, all of Germany

[73] Assignee: Robert Bosch GmbH, Stuttgart, Germany

[22] Filed: July 14, 1971

[21] Appl. No.: 162,339

[30] Foreign Application Priority Data
July 24, 1970 Germany............... P 20 36 732.2

[52] U.S. Cl.............. 192/0.09, 74/339, 74/850, 192/3.58, 192/4 A, 123/148.5
[51] Int. Cl....................... B60k 29/00, B60k 21/00
[58] Field of Search.................. 192/0.09, 0.092, 192/3.56, 3.58, 4 A

[56] References Cited
UNITED STATES PATENTS
2,952,346  9/1960  Costa et al................ 192/0.092
3,335,830  8/1967  Castelet.................... 192/0.092
3,372,602  3/1968  Papst....................... 192/3.56 X
3,548,980  12/1970  Schmidt.................... 192/0.09
3,628,642  12/1971  Ravenel.................... 192/3.56

Primary Examiner—Benjamin W. Wyche
Attorney—Holman & Stern

[57] ABSTRACT

An automatic gear change system for automatically actuating gear shift devices of a stepped change speed gear box of a motor-vehicle provided with a clutch means comprises a central control device; means for monitoring input and output speeds of the stepped change-speed gear box during synchronous running of input and output transmission shafts to be coupled to each other; and synchronizing aids for expediting synchronous running of the two transmission shafts. The control device includes a synchronizing circuit arrangement producing digital control signals during super-synchronous, sub-synchronous and substantially synchronous running of the two transmission shafts, and further includes switching logic means comprising digitally operating switching and gating circuits which actuate the synchronizing aids, gear shift devices and the clutch means. The synchronizing circuit arrangement advantageously uses two Schmitt triggers having different response and fallout thresholds.

63 Claims, 20 Drawing Figures

INVENTORS
H. ESPENSCHIED
V. KADELBACH
G. ROTHFUSS
H. SCHEYHING
B. MATTES
R. BURKEL
E. ERBEN
K.O. HUPFELD
H. WEYER
BY their ATTORNEY INVENTORS
H. ESPENSCHIED
V. KADELBACH
G. ROTHFUSS
H. SCHEYHING
B. MATTES
R. BURKEL
E. ERBEN
K.O. HUPFELD
H. WEYER
BY their ATTORNEY

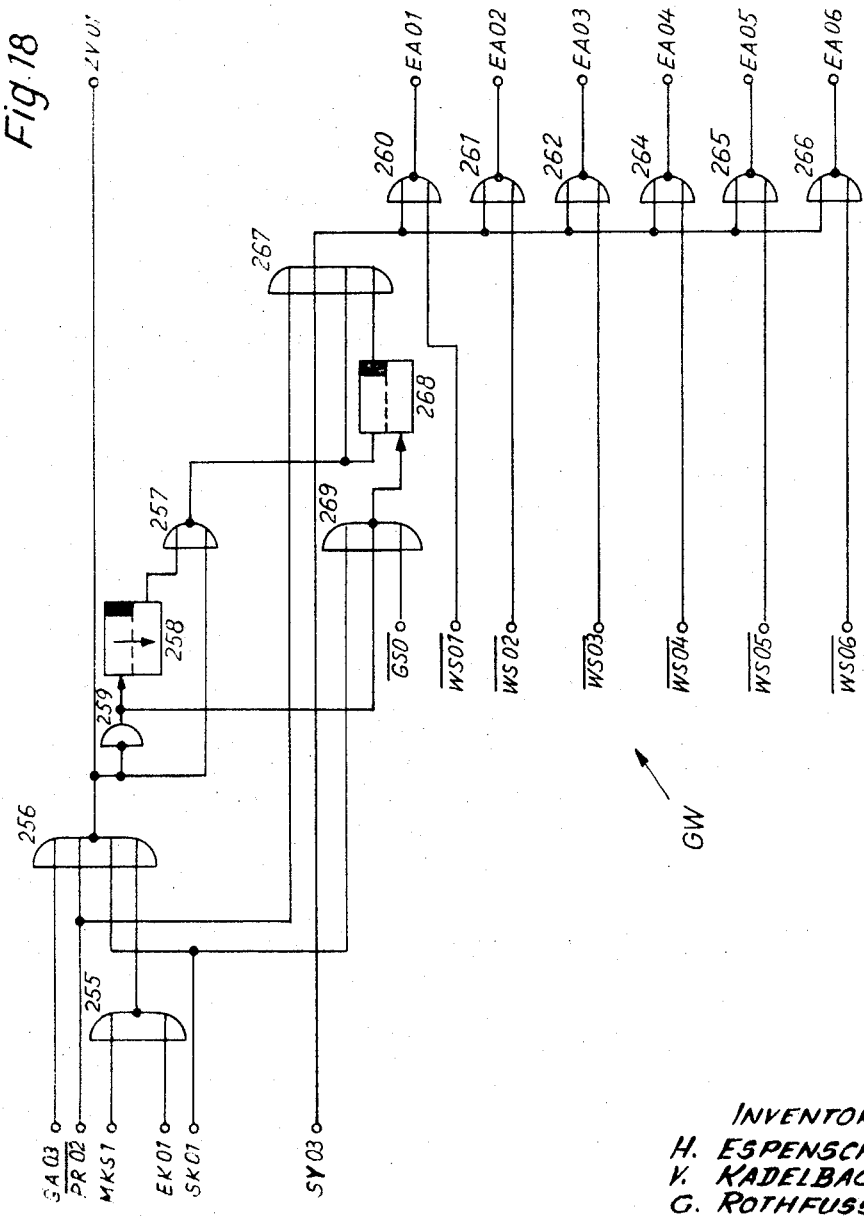

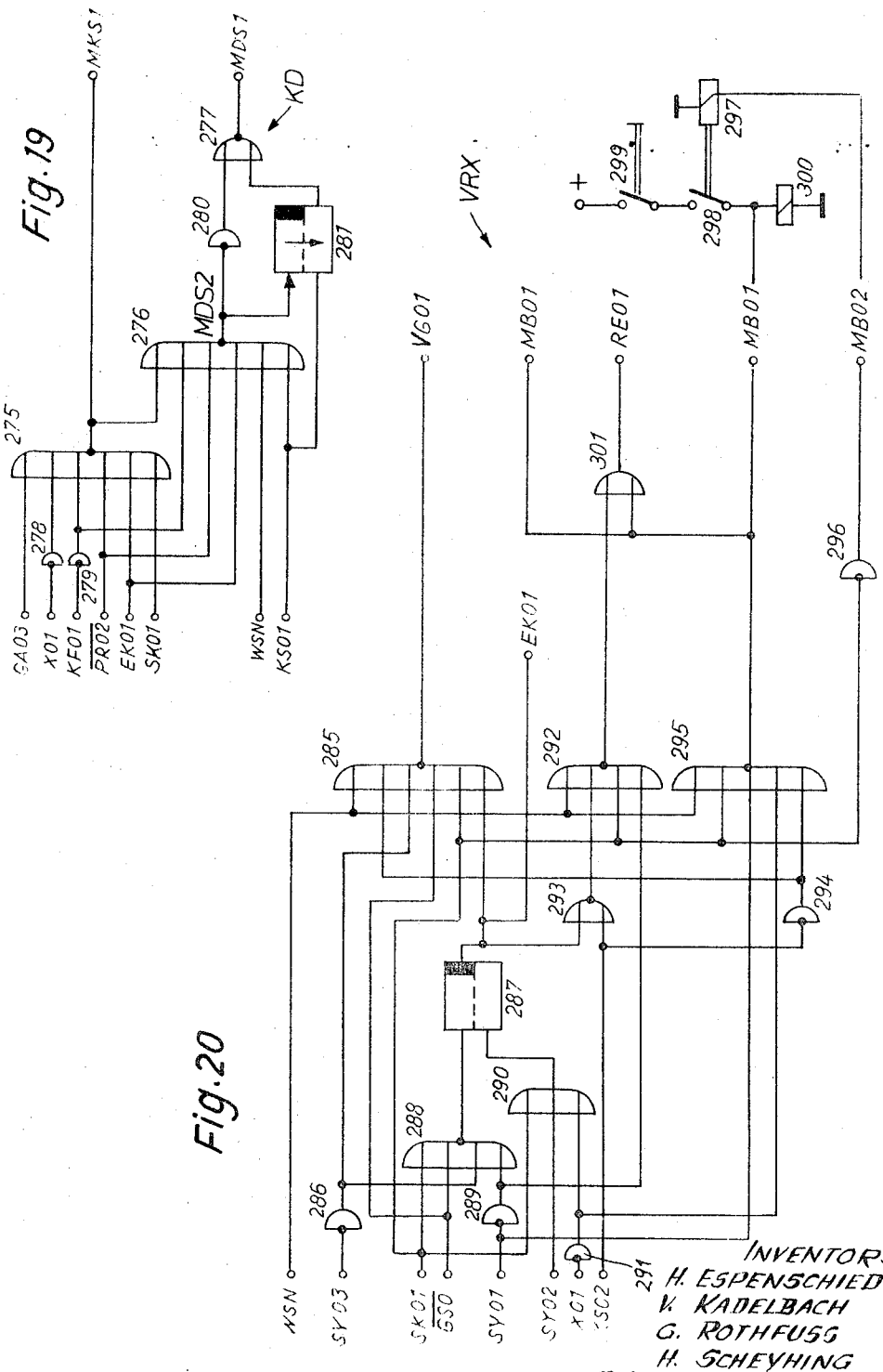

INTERRELATED CONTROLS FOR GEARING, CLUTCH, BRAKES AND ENGINE

BACKGROUND OF THE INVENTION

The invention relates to an automatic gear change system in a motor vehicle, such as a commercial vehicle, in which the driving power of an internal combustion engine is transmitted to the drive wheels by means of the stepped charge-speed gear box.

DESCRIPTION OF PRIOR ART

British Pat. Specification No. 1,111,246 describes a gear box control system having a central control device in which commands for further actuation of the stepped change-speed gear box are produced from measured variables for the input speed and output speed of the gear box during synchronous running of the transmission shafts to be coupled to one another, and having synchronizing aids for expediting synchronous running. The rotational speeds of a gear box input shaft and a gear box output shaft of a stepped change-speed gear box are measured by means of tacho-generators whereby the measured values of the rotational speed are applied to the two windings of a differential relay for the purpose of ascertaining the synchronous running of the two transmission shafts. A gear-shift operation is performed during the operative period of a timer which is triggered by the differential relay upon attainment of synchronous running. This known system operates relatively slowly, since a relay control arrangement is involved, so that the velocity of the vehicle can vary considerably during a gear-shift operation, the system being susceptible to faults, caused for example by vibration, owing to the mechanical contacts. Furthermore, owing to the associated expense, it is impossible when initiating gear-shift operations in the case of a relay control arrangement to take into account a sufficiently large number of safety factors such that the driver of a vehicle equipped in such a manner is no longer distracted by the gear-shift operations. Thus, for example, the engine must not be raced, and no gear-shift operation or disengagement of the clutch must take place when parts of the system, the control arrangement or the auxiliary units have been destroyed or if extreme travelling conditions can occur for the vehicle.

SUMMARY OF THE INVENTION

A feature of the present invention is to provide a gear box control system by means of which a stepped change-speed gear box can be actuated with sufficient rapidity to prevent all but a negligible variation in the velocity of a vehicle to which the system is fitted, during a gear-shift operation. A number of safety factors are to be taken into account before each gear-shift operation, so that the vehicle cannot be endangered even when there are faults in the gear box control system or in the auxiliary units or during extreme operating conditions. Furthermore, the gear box control system is to be of extremely robust and operationally reliable construction, so that its satisfactory operation is not impaired by the rough operating conditions of a motor vehicle even for long periods of operation.

Furthermore, the vehicle, the engine and the gear box are to be protected by ensuring that gear engagement takes place only during accurate synchronous running of the transmission shafts to be coupled, and the driver of the motor vehicle is to be relieved of being conscious of the gear-shift operations so that he can give his full attention to the road traffic.

A control device for an automatic gear change system according to the invention includes a synchronizing circuit arrangement for producing control signals to indicate supersynchronous running, sub-synchronous running and substantially synchronous running of the transmission shafts to be coupled during a gear change, and switching logic control device which comprises digitally operating switching circuits, gates and which control device produces and processes all other switching commands and, taking into account all safety and control signals, serves to actuate the synchronizing aids, gear-shift devices, and a clutch located between the crankshaft of the internal combustion engine and the gear box input shaft.

It is possible for the control device to be of compact construction particularly when it is constructed from electronic components and/or so-called integrated switching circuits. The digital method of operation of the switching logic ensures reliable, trouble-free operation for long periods of use, since slight variations in the characteristic magnitudes of the components, as a result of aging for example, do not impair the switching behaviour of the components. The vibrations frequently occurring in vehicles do not impair function of the control device, since no movable contacts are provided.

In the known system for establishing synchronous running of two transmission shafts, a differential relay having two windings is used, the two windings of which are connected to two tacho-generators coupled to the transmission shafts. To enable such a system to operate without contacts, the synchronizing circuit arrangement of the present invention may comprise two Schmitt triggers having different response and fall-out thresholds, the sum of the measured variables for the gear box input and gear box output speeds being fed to each of the two Schmitt triggers, the two measured variables having opposite signs and, corresponding to the gear to be engaged, the measured variable of the gear box output speed being transformed to a measuring range which can be matched with the measuring range of the measured variable of the gear box input speed.

Furthermore, the use of Schmitt triggers has the advantage that their response and fall-out thresholds may readily be adjusted, so that it is possible to adjust the speed ratios at which the synchronization signals or the signals for super-synchronous or sub-synchronous running appear and disappear again. Advantageously, the Schmitt triggers are set so that the synchronous running signal is produced shortly before attaining actual synchronous running, to compensate for idle times of the entire electro-mechanical system between synchronous running of the transmission shafts and response by the gear-shift devices whereby the gear-shift times are shortened.

For the purpose of measuring the speed of the transmission shafts, the known gear box control system uses three-phase generators whose output voltages are rectified. Thus, the measured speed variables appear as analog variables. To prevent any possible faults and variations due to ageing, soiling or wear, in the system of the present invention each tacho-generator may include a toothed wheel which cooperates with a pulse generator whose output delivers pulses in the form of a pulse train, whose pulse frequency represents speed, during rotation of the toothed wheel. The output pulses from each pulse generator trigger a monostable trigger device whose output voltage is smoothed in a low-pass filter, so that a d.c. voltage proportional to speed may be taken from the output of each low-pass filter. To obtain operational reliability, each pulse generator may be in the form of a proximity detector having a toothed ferromagnetic wheel and a magnet which produces pulses when the teeth of the wheel pass the magnet.

To prevent absurd gear-shift commands from being transmitted to the gear box if a tacho-generator fails, tacho-failure detectors can be connected to the outputs of the two pulse generators, the outputs of the two tacho-failure detectors being connected to a gating circuit whose output signal serves to indicate failure of a tacho-generator and to block a gear-shift operation.

Preferably the switching logic includes a change-down blocking trigger stage which comprises a Schmitt trigger which is controlled by a speed signal, the speed signal corresponding to the speed of the internal combustion engine. The response threshold of this Schmitt trigger is such that the Schmitt trigger is triggered at a speed corresponding to what would be substantially the maximum permitted speed of the internal combustion engine at the newly selected gear and its output signal then blocks a change-down operation. Thus, the change-down blocking trigger stage prevents the internal combustion engine from being operated at an inadmissible high speed or prevents commencement of a gear-shift operation which would only put the gear box into its neutral position, it then being no longer possible to engage a fresh gear since the maximum permissible engine speed would be exceeded. When travelling downhill, a gear-shift operation which has not been fully carried out could result in the driver losing control of his vehicle.

Known systems have a mechanical stepping mechanism which is connected to a selector switch for the gears to be engaged. By stepping up the stepping mechanism by means of the selector switch, the driver determines which gear is to be engaged. However, to avoid mechanical contacts which are susceptible to trouble, and in accordance with a further feature of the invention, the switching logic of the gear box control system includes, instead of a stepping mechanism, a selector switch position memory which comprises a counter constructed with bistable trigger stages, each trigger stage having two complementary outputs. One of the two outputs of one bistable trigger stage is optionally connected to the following bistable trigger stage by means of a switching direction circuitry. Thus, forward counting can be effected by the counter when changing to a higher gear, and backward counting when changing to a lower gear.

Similar advantages which result from the use of a digital memory in conjunction with the selector switch are obtained when using a gear box position memory the inputs of which are connected to gear box position switches located on the gear box. The outputs of the gear box position memory produce a normal signal and its inverted signal for each gear. With the exception of limit switches for the positions of the gears, no mechanical switches such as relays or the like are included, so that, in this case also, maximum freedom from faults is obtained. In order to obtain optimum operation reliability of the limit switches, it is advisable to use protective gas contacts (so-called reed contacts) or proximity detectors which operate without contacts.

The safety of the vehicle is substantially increased if gear-shift commands which cannot be carried out are eliminated before commencement of a gear-shift operation, for example before disengagement of the clutch. The driving connection between the engine and the gear box is then not even interrupted, which is extremely essential when a vehicle is travelling downhill. In accordance with a further feature of the invention, the switching logic includes a change-down monitoring circuit the input signals of which are the output signals of the gear box position memory and of the selector switch position memory and the output signal of which indicates whether a change-down operation can be carried out by virtue of the travelling state, all permissible change-down conditions related to gear box position and selector switch position being simulated by means of interrelated logic signals in the change-down monitoring circuit.

In order to take into account the various safety signals before initiating a gear-shift operation, it has proved to be advantageous to provide within the switching logic a gear-shift command generating stage in which the positions of the gear box position memory are compared with those of the selector switch position memory for each gear, and in which connections are provided for blocking the generating of gear-shift commands in dependence upon the various safety factors to be taken into account.

Advantageously, the gear-shift devices are in the form of hydraulically operating devices since their response and actuating times are particularly short. A system according to a further feature of the invention for a hydraulically operating gear shift device, which has a disengaging valve for putting the gear box into the neutral position when actuated and which has gear-shift valves for engaging the gears, embodies a switching logic means which includes a gear-change circuit which controls the disengaging valve and the gear-shift valves the inputs of which are connected to the outputs of the selector switch position memory, the gear-shift command generating circuit, the tacho-failure safety device and a pressure failure indicator, and to which furthermore the travelling state signals are fed for hydrulically actuating the clutch.

BRIEF DESCRIPTION OF THE DRAWINGS

The invention is further described, by way of example, with reference to the accompanying drawings, in which:

FIG. 18 is a block circuit diagram of a gear-change circuit;

FIG. 19 is a block circuit diagram of a clutch actuating circuit, and

FIG. 20 is a block circuit diagram of a control circuit for synchronizing aids.

DESCRIPTION OF THE PREFERRED EMBODIMENTS

Figure 1:
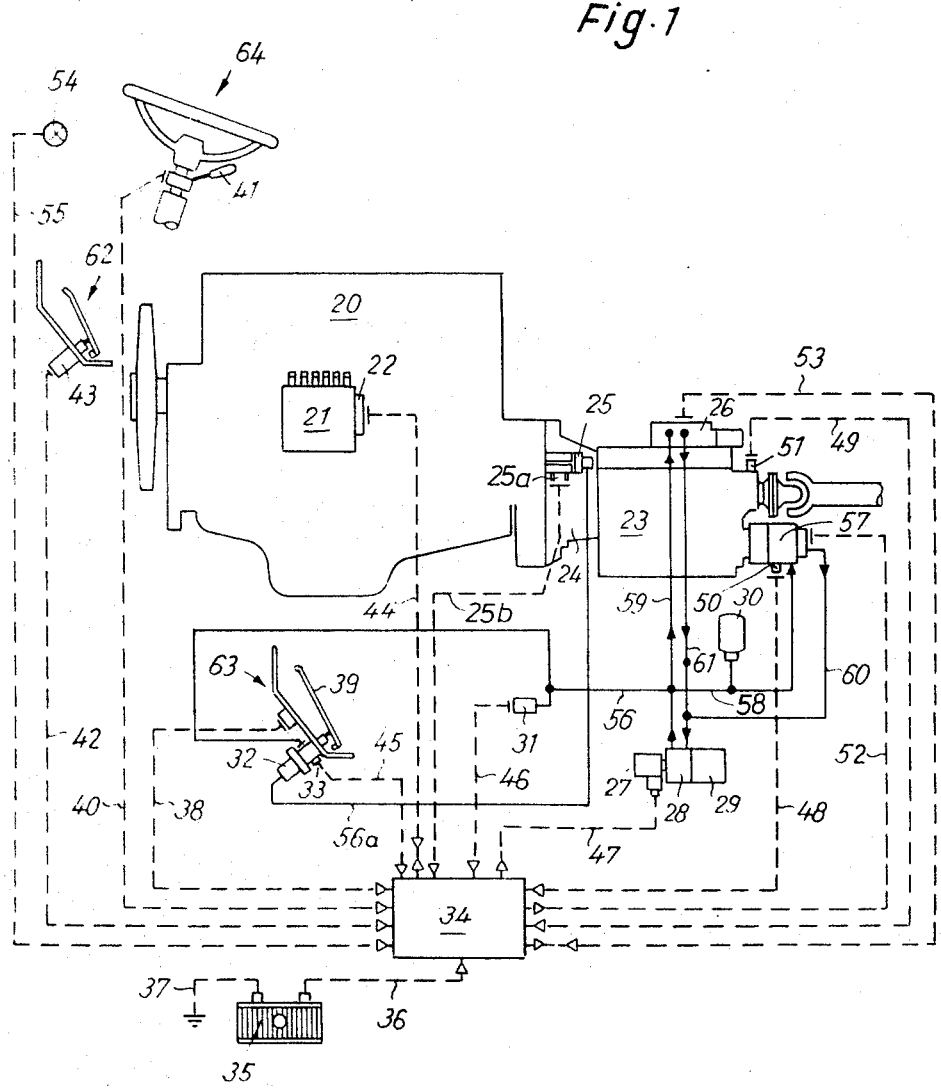
FIG. 1 is a diagrammatic general view of ancillary units which are required for a gear box control system in a motor vehicle constructed in accordance with the invention.

Referring to FIG. 1, a commercial vehicle is fitted with a Diesel internal combustion engine 20 (hereinafter referred to as "the engine"). Fuel to be injected into the engine combustion chambers by an injection pump 21 is metered by means of an electronic fuel regulator 22. A clutch 24 is operable by means of a hydraulic piston 25 is located between the engine 20 and a stepped change-speed gear box 23. The gear box 23 may be actuated by a hydraulically operating gear-shift device 26. The auxiliary hydraulic energy is produced by a pump unit having a pump 28 which is driven by an electric motor 27 and which draws hydraulic fluid from a hydraulic reservoir 29. The pump 28 feeds a hydraulic accumulator 30. A pressure switch 31 is provided for monitoring the pressure of the hydraulic unit. The clutch is preferably actuated during moving-off operations by way of a foot pedal 63 by means of a clutch master cylinder 32 which is connected to the hydraulic piston or, during gear-shift operations, hydraulically in that it is controllable by way of an actuating switch 33. All gear-shift operations are initiated and monitored by an electronic control device 34. A supply voltage is fed to the control device 34 from a battery 35 by way of a lead 36. The battery is electrically connected to earth at 37. In general, all electrical leads are shown by broken lines in FIG. 1, and all hydraulic conduits are shown by solid lines. The control device 34 is connected by way of a lead 38 to a foot-operated clutch switch 39, by way of a lead 40 to a selector switch 41 for selecting the gear to be engaged, and by way of a lead 42 to a transducer 43 respeonsive to the travel of an accelerator pedal 62. A lead 44 establishes connection to the electronic fuel regulator 22, and a lead 45 connects the actuating switch 33 on the clutch master cylinder to the control device 34. For the purpose of monitoring the pressure in the hydraulic system, the pressure switch 31 is connected by way of a lead 46 to the control device which, by way of a lead 47, switches on the electric motor 27 for driving the pump 28. The output signals from a gear box input tacho-generator 50 and from a gear box output tacho-generator 51 are fed to the control device 34 by way of leads 48 and 49. The input tacho-generator 50 is shown located on the gear box lay-shaft, which is possible when the lay-shaft is permanently driven by the gear box input shaft. A lay-shaft brake 57 which serves as a synchronizing aid is controlled by the control device by way of a lead 52. The gear-shift device 26 receives signals for gear change by way of a lead 53. To enable the driver to determine which gear is engaged, an indicator 54 is connected to the control device by way of a lead 55. The pressure side of the pump 28 is connected to the pressure switch 31 and to the clutch master cylinder 32 by way of a hydraulic conduit 56, to the hydraulic accumulator 30 and to the lay-shaft brake 57 by way of a hydraulic conduit 58, and to the gear shift device 26 by way of a hydraulic conduit 59. The suction side of the pump 28 is connected to the lay shaft brake 57 by way of a hydraulic conduit 60, and to the gear-shift device 26 by way of a hydraulic conduit 61.

The clutch master cylinder 32 is connected to the hydraulic piston 25 by way of a hydraulic conduit 56a for the purpose of actuating the clutch. The hydraulic piston 25 has contacts 25a which serve to detect the position of the clutch and which are connected by a lead 25b to the control device 34. The accelerator pedal 62, the clutch pedal 64, and a steering wheel 64 are shown diagrammatically in the figure.

In the embodiment illustrated, the driver initiates all gear-shift operations by actuating the selector switch 41. The selector switch has a contact for changing to a higher gear, a contact for changing to a lower gear, and a contact for putting the gear box into neutral. To enable a gear to be changed, it is necessary to impart the same rotational speeds to the parts of the gear box to be coupled together. When changing to a higher gear, this is achieved in that the gear box is braked by the amount of the speed differential between two gears by means of the lay shaft brake 57 which is switched on by the control device 34. On the other hand, when changing to a lower gear, the gear box must be accelerated by the amount of the relevant speed differential and for this purpose the electronic fuel regulator 22 is controlled by the control device 34 in such a way that the fuel regulator 22 accelerates the engine. The actuating switch 33 connected to the clutch master cylinder 32 enables the clutch between the engine 20 and the gear box 23 to be disengaged without the driver having to depress the clutch pedal. When thp fuel regulator 22 is controlled by the control device 34 during a gear-shift operation, the travel transducer 43 on the accelerator pedal 62 is switched off so that the driver can leave his foot on the accelerator pedal during the gear-shift operation without influencing the engine speed. During change to a higher gear, in order to accelerate the braking of the engine, the speed of the engine is reduced by means of the electronic fuel regulator. An engine brake (not illustrated in the FIG.) which closes the engine exhaust, and which thus also decelerates the engine, can be switched on in addition to the lay shaft brake 57.

Although an electronic fuel regulator is used in the illustrated embodiment, the invention is not limited to the use of an electronic fuel regulator, and any conventional fuel regulator may be used.

Figure 2:
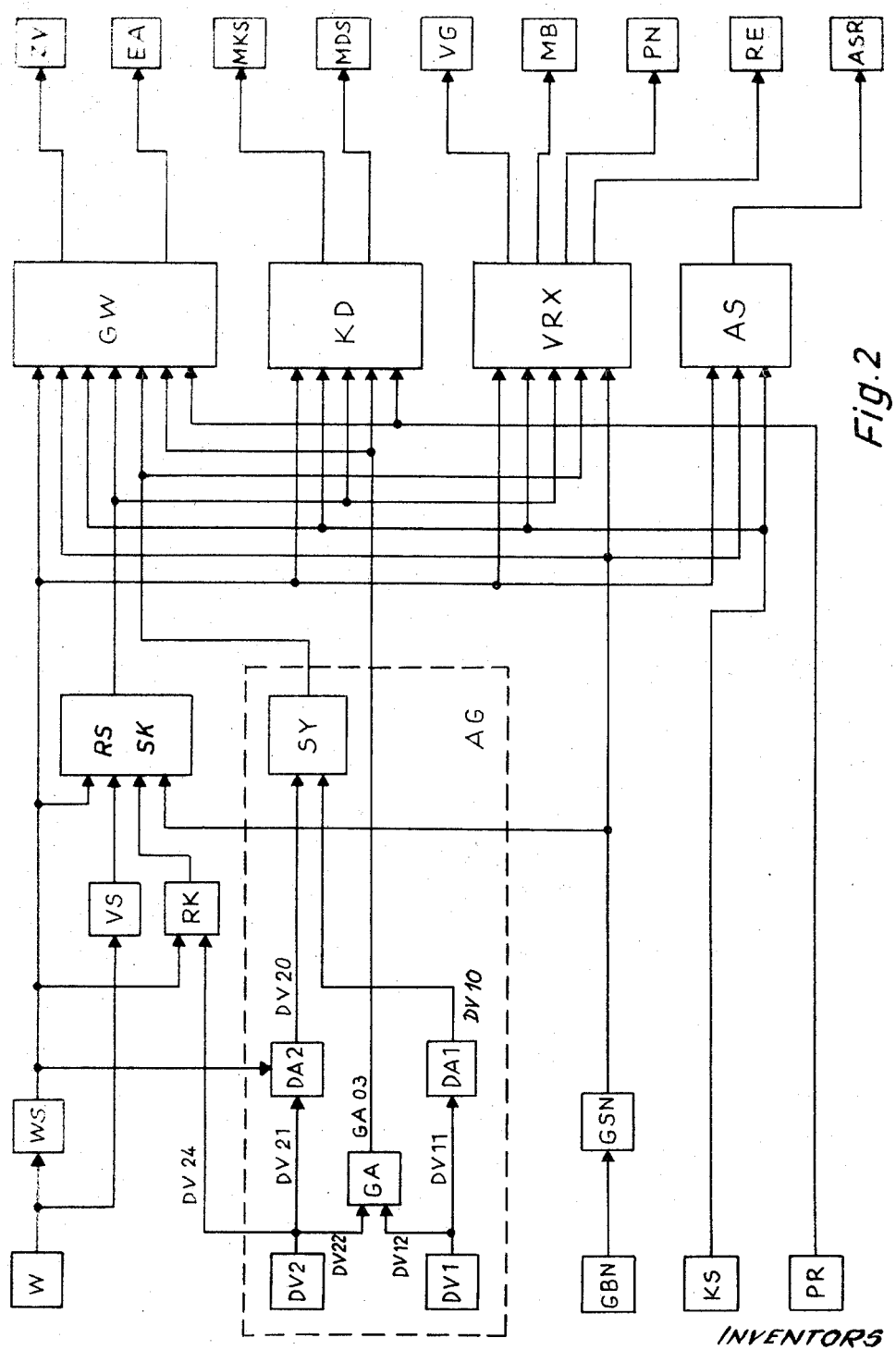
FIG. 2 is a block circuit diagram of an electronic control device.

The basic method of operation of the synchronizing circuit arrangement and of the switching or circuit logic may be seen from the block circuit diagram of the electronic control device illustrated in FIG. 2.

A synchronizing circuity SY and those parts of the circuitry which produce the input signals for the synchronizing circuit SY are demarcated from the rest of the switching logic by a broken line and form a unit AG. They are set apart in this manner since they operate partially analogously and not purely digitally and are therefore not properly designated "switching logic." The gear box input tacho-generator DV1 (50 in FIG. 1) is driven by the input of the gear box, and the gear box output tacho-generator DV 2 (51 in FIG. 1) is coupled to the gear box output shaft. The two measured variables of speed are fed to a tacho-failure safety device GA as input signals DV 12 and DV 22. The output signal GA 03 from the tacho-failure safety device GA is fed to the rest of the switching logic and prevents a gear-shift operation from being effected when a tacho-generator fails. The output signals from the tacho-generators are fed to voltage matching stages DA 1 and DA 2 as DV 11 and DV 21. The output signal of the voltage matching stage DA 1 is designated DV 10, and the output signal of the voltage matching stage DA 2 is designated DV 20; the two signalds DV 10 and DV 20 are fed to the synchronizing circuit SY which produces therefrom information signals which indicate synchronous running or super-synchronous or subsynchronous running. For the purpose of simplifying the illustration, the entire flow of information is indicated only by a solid line, although the individual components of the control device have a plurality of outputs whose output signals nevertheless constitute one piece of information when considered together. The connections between the individual components of the switching logic are in the form of multiple wires. The gear to be engaged is selected by means of the selector switch W (41 in FIG. 1). Thus, the selector switch can be actuated for changing to a higher gear, changing to a lower gear, or for changing to neutral. The selector switch thereby varies the position of a selector switch position memory WS. The position of the selector switch position memory WS is raised by one value during change to a higher gear and lowered ky one value during change to a lower gear and brought to zero at neutral. The information in the selector switch position memory is fed to the voltage matching stage DA 2 where it causes the output voltage of the gear box output tacho-generator, designated as input signal DV 21 to the voltage matching stage DA 2, to be cut down for each gear ratio to a voltage which corresponds to the output voltage at the output of the potential matching stage DA 1 for the gear box input.

It is possible to actuate the gear box with preselection. For this purpose, a preselector memory VS is connected to the selector switch W. If the gears are to be actuated with preselection, a normally-open contact FG (not shown in FIG. 2) e.g. located on the selector switch, has to be closed for the purpose of initiating the gear change, but in contrast to conventional preselection the driver does not have to depress the clutch pedal. The control operation for the gear change previously selected takes place in exactly the same manner as gear change without preselection, and all safety information is taken into account. If, for example, it is then impossible to change to a lower gear, this is indicated and, if required, the gear change is effected only when it can be realised on the basis of the travelling state of the engine and gear box.

By way of example, the gears must not be changed down if it would be necessary to overspeed the engine to obtain synchronization for a change-down into the next lower gear. To prevent such change-down, a change-down blocking trigger stage RK is connected to the output of the selector switch position memory WS and to the output of the gear box output tachogenerator DV 2. The output voltage DV 24 of the gear box output tacho-generator DV 2 is transformed in the change-down blocking trigger stage RK to a value whose magnitude is comparable with the measured value of the gear box input speed. If, upon selection of a next lower gear, this voltage is too high, this constitutes the information that the engine speed is too high. In order to prevent a downward gear change under these circumstances, a trigger circuit in the trigger stage RK is triggered, the response threshold of this trigger circuit being at a value which just exceeds the maximum engine speed.

In order to determine which gear has actually been engaged, gear box position switches GBN (not shown in FIG. 1, but shown in FIG. 2) corresponding in number to the number of gears are provided on the gear box. The gear box position switches GBN are connected to a gear box position memory GSN in which the position of the gear box is stored in a form which may be compared with the selector switch position memory. If the output signals of these two memories are identical, the last gear selected corresponds to the gear engaged in the gear box.

If a gear-shift operation is to be initiated, it is effected in dependence upon the output signal of a gear-shift command generating circuit SK in which the signals stored in the selector switch position memory WS and the gear box position memory GSN are compared. When changing gear with preselection, the position of the preselector memory VS is additionally fed to the circuit SK. To prevent a gear-shift command from being produced when the engine would have to be over-sped during change-down, the output signal of the change-down blocking trigger stage RK is also fed to the gear-shift command generating circuit SK. Furthermore, there is provided a change-down monitoring circuit RS which, with reference to the change-down blocking trigger stage, checks whether a change-down operation is imminent and decides whether it can be carried out.

Furthermore, the position of the vehicle clutch constitutes essential information for a gear change, this information being supplied by the clutch position contacts KS (25a and 39 in FIG. 1). It is also important to check the pressure in the system of hydraulic auxiliary devices. For this purpose, the monitoring circuit PR (including the switch 31 of FIG. 1) is provided for the system pressure. The output signals of the gear-shift command generating circuit SK, the synchronizing circuit SY, the selector switch position memory WS, the gear box position memory GSN, the clutch position contacts KS, and the monitoring circuit PR for system pressure control all those parts of the switching logic which by reason of the combination of the input signals available, control an actuating element. These parts of the swtiching logic are a gear-change circuit GW, a clutch actuating circuit KD, a synchronizing aid control circuit VRX, and a starter blocking device AS for preventing operation of the usual starter motor.

The input signals fed to the gear-change circuit GW are the output signals of the selector switch position memory WS and the gear box position memory GSN, and the signals from the clutch position contacts KS, from the monitoring circuit PR for the system pressure, from the tacho-failure safety device GA, from the synchronizing circuit SY, and from the gear-shift command generating circuit SK. The gear-change circuit GW controls a disengaging valve ZV and gear engaging solenoid valves EA (collectively forming part of 26 in FIG. 1). The disengaging valve causes the gear box to be brought into its neutral position. A gear engaging valve is provided for each gear and, when actuated, engages the respective gear. The disengaging valve ZV can be actuated only when pressure is available in the hydraulic system, which is established by the monitoring circuit PR, when the tacho-tailure safety device GA has not responded, when a gear change command exists, and when the clutch is disengaged. The gear engaging valves EA are energized when, in addition to the conditions for response of the disengaging valve, the synchronizing circuit provides a syncronizing signal, and when the positions of the gear box position memory and the selector switch position memory are not identical.

The clutch actuating circuit KD controls the clutch fully automatically for the purpose of rapid disengagement and slow reengagement during the gear-shift operations. The clutch is actuated hydraulically and the hydraulic medium is conducted to the clutch actuating cylinder by means of solenoid valves MKS and MDS (jointly 33 in FIG. 1) in conformity with the desired actuation of the clutch. Accordingly, the solenoid valve MKS is actuated for rapid movement of the clutch and the flow throttle MDS is actuated for slow movement of the clutch. The clutch solenoid valve MKS is energized when the monitoring circuit PR signals that pressure is present in the hydraulic system, when the tacho-failure safety device GA has not responded, when the vehicle is not stationary, when a gear shift command exists, and when the clutch has not been actuated. The information that the vehicle is not stationary is provided by a signal X 03 (not illustrated in the figure) which can be produced in a simple manner by, for example, the gear box output tacho-generator DV 2. In order that the clutch may travel rapidly through its clearance (the range in which it is not engaged) during change-down operations, the valve MKS may be switched on for a period suitable for the clutch to travel through this clearance.

A signal for actuating the flow throttle MDS for slow engagement of the clutch appears when pressure is available in the hydraulic system, when the clutch pedal to be operated by the driver has not been actuated, when the solenoid valve MKS for rapid movement of the clutch has not been actuated and the clutch position contacts KS indicate that the clutch is disengaged, and when the selector switch position memory WS is not in the neutral position for the gear box. A further variant (not illustrated in the above block circuit diagram) is possible for rapid change-down operations. The clutch is then disengaged only in order to put the gear box into neutral. The clutch is immediately reengaged when the gear box is in the neutral position. With accurate synchronization, the next lower gear may be engaged without disengaging the clutch.

The synchronizing aids control circuit VRX actuates the synchronizing aids which comprise the lay shaft brake VG (57 in FIG. 1), the engine brake MB (not shown in FIG. 1), a pedal cut-out PN, and the electronic fuel regulator RE (22 in FIG. 1). The pedal cut-out PN switches off all devices, other than the usual wheel brakes, by which the driver can arbitrarily influence the behaviour of the vehicle and enables the engine speed to be accelerated or decelerated automatically and fully independently of the positions of all the devices which may be influenced by the driver. The lay shaft brake VG is actuated when supersynchronous running is signalled by the synchronizing circuit SY, when a gear-shift command exists, when the gear box position memory signals the neutral position and the neutral position is not stored in the position memory, and when the clutch position contacts signal that the clutch is disengaged. As soon as synchronous running is signalled, the synchronization aids control circuit VRX switches off the lay shaft brake or the engine brake which, if required, has been additionally actuated. The engine brake MB is applied in accordance with the same principles as the gear box (lay shaft) brake. As additional information for switching on the engine brake, it may be taken into account whether the vehicle is stationary, which is effected by the signal X 03 but which is not illustrated in the Figure. The electronic fuel regulator RE is put into operation simultaneously with the engine brake and the lay shaft brake. The speed of engine is reduced by way of the fuel supply during super-synchronous running, and the speed of the engine is increased by means of the electronic fuel regulator during sub-synchronous running.

The starter blocking device AS is a further safety device. When a starter blocking relay ASR is triggered, a starting operation is inhibited. It is possible to start the engine when the selector switch position memory WS and the gear box position memory GSN are in the neutral position or when the clutch position contacts KS signal that the clutch is disengaged.

Figure 3:
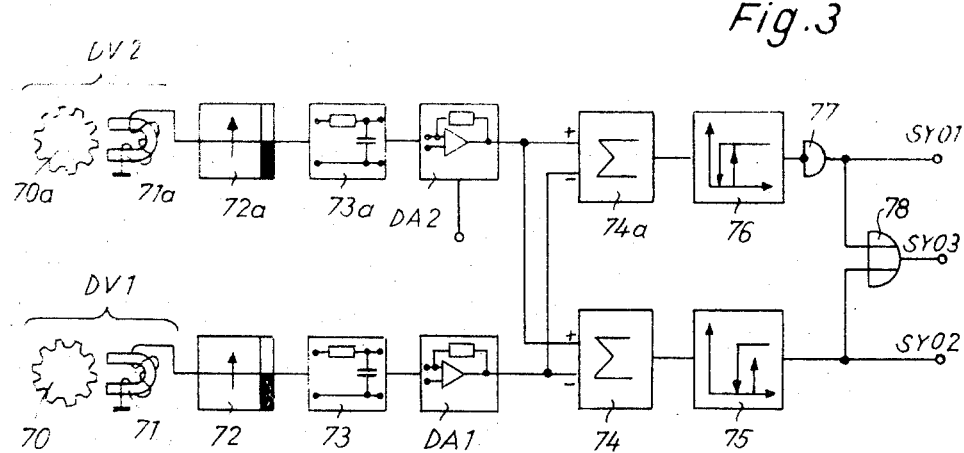
FIG. 3 is the block circuit diagram of a synchronizing circuit arrangement.

FIG. 3 is a block circuit diagram of the unit AG which is illustrated in FIG. 2, with the omission of the tacho-failure safety device GA. The tacho-failure safety device GA will be explained with reference to a later Figure. The gear box input tacho-generator DV 1 and the gear box output tacho-generator DV 2 are shown as pulse generators; the gear box input tacho-generator DV 1 includes a toothed wheel 70 whose teeth are sensed by a proximity detector 71 shown in the form of a pick-up coil. The output pulses from the proximity detector 71 trigger a monostable multivibrator 72. The output pulses from the monostable multivibrator 72 are fed to a smoothing circuit comprising a low-pass filter 73 which filters the a.c. component from the pulse train, so that there appears at the output of the low-pass filter a d.c. voltage whose value is proportional to the pulse frequency of the monostable multivibrator 72. The d.c. voltage at the output of the low-pass filter is fed to the voltage matching stage DA 1 in which it is converted to a value in a range which is suitable for subsequent processing. The gear box output tacho-generator DV 2 is constructed in the same manner as the gear box input tacho-generator DV 1. It has a toothed wheel 70a whose teeth are sensed by a proximity detector 72a. The proximity detector 71a is connected to a monostable multivibrator 72a which is in turn connected to a low-pass filter 73a. The output voltage of the low-pass filter 73a is fed to the input of the voltage matching stage DA 2. As already shown in FIG. 2, the voltage matching stage DA 2 is switched over by the selector switch position memory WS such that its output voltage is comparable with the output voltage of the voltage matching stage DA 1 for each gear. The output voltages of the two voltage matching stages DA 1 and DA 2 are added in each of two summators 74 and 74a. The two summators 74 and 74a are indicated symbolically by the sigma signs in the circuit blocks and they may be realised in a simple manner by summating on resistors. The output voltage of the summator 74 is fed to a Schmitt trigger 75, and the output voltage of the summator 74a is fed to a Schmitt trigger 76. The two Schmitt triggers 75 and 76 have different response thresholds as shown by the characteristics in the circuit blocks. The output signal of the Schmitt trigger 76 is inverted in a negator 77 and then appears as the output signal SY 01 of the synchronizing circuit SY. The output signal of the Schmitt trigger 75 constitutes the output signal SY 02 of the synchronizing circuit. The output signals SY 01 and SY 02 are fed to an OR gate 78 from the output of which may be taken the output signal SY 03 of the synchronizing circuit.

The described arrangement operates in the following manner:

Pulses which trigger the monostable multivibrators 72 and 72a are produced by the proximity detectors 71 and 71a of the tacho-generators DV 1 and DV 2. The monostable multivibrators have a constant relaxation period, so that the d.c. component of their output pulse trains is proportional to the number of relaxation operations and thus to the rotational speed of the respective toothed wheels 70 and 70a. The d.c. components are converted by the low-pass filters 73 and 73a and in the two voltage matching stages DA 1 and DA 2, into a voltage range in which the gear box output speed voltage associated with each gear can be compared with the gear box input speed voltage. The gear box input shaft and the gear box output shaft run synchronously when the two voltages are equal. In order to establish the points of synchronization in a simple manner by addition, the voltages on the voltage matching stages DA 1 and DA 2 have opposite signs. The two Schmitt triggers 75 and 76 are provided in order to compare the speeds at the gear box input and at the gear box output whilst taking into account the different transmission ratios of the gear box and in order to indicate synchronous running or supersynchronous or sub-synchronous running. the sum of the output voltages of the potential matching stages DA 1 and DA 2 is applied to the input of each Schmitt trigger. The threshold values of the Schmitt triggers 75 and 76 vary substantially as shown in the Figure. The Schmitt trigger 76 is triggered in the first instance when the total voltage at the inputs of the two Schmitt triggers increases, and the Schmitt trigger 75 is also triggered if the voltage continues to increase. In the range of speed in which the Schmitt trigger 76 has been triggered and the Schmitt trigger 75 has not yet been triggered, zero voltage is present at SY 01, at SY 02, and at SY 03. Zero voltage at SY 03 thus signifies synchronous running. Thus, synchronous running exists when one of the Schmitt triggers has been triggered and the other Schmitt trigger has not yet been triggered. SY 01 is zero when the Schmitt trigger 76 has been triggered, since the negater 77 inverts the output voltage of this Schmitt trigger. A signal voltage appears at SY 03 when the two Schmitt triggers have been triggered or have not been triggered, thus indicating that synchronous running does not exist. If the absence of a voltage is defined by logic 0 and the presence of a voltage is defined by logic 1, logic 0 at SY 03 indicates that synchronous running exists. As soon as logic 0 disappears again synchronous running no longer exists. Voltage appears at SY 01 when the two Schmitt triggers 75 and 76 have not yet been triggered, which means that SY 01 has the value logic 1 during sub-synchronous running. Correspondingly, SY 02 has the value logic 1 during super-synchronous running during which the two Schmitt triggers have been triggered. However, the Schmitt triggers 76 and 75 are set such that their switching points do not coincide exactly with synchronous running, but are respectively above and below the synchronization point by a fixed speed differential. The switching point of the Schmitt trigger 76 is such that the Schmitt trigger is triggered before the synchronization point by the amount of an adjustable speed value, and the switching point of the Schmitt trigger 75 is such that the Schmitt trigger is triggered at a different fixed value above the synchronization point. The speed margin at which SY 03 becomes 0 when sub-synchronous running approaches the synchronization point, differs from the speed margin when super-synchronous running approaches the synchronization point. The magnitudes of these two speed margins constitute empirical values. They serve for rendering ineffective for the gear-shift operation the dead times which occur in the system between synchronizing signal and mechanical movement of the gear-shift device, so that further gear change can be effected as rapidly as possible. This is important, since the transmission of power between the engine and the gear box is interrupted during further gear change and, when travelling uphill for example, the velocity of a heavy motor vehicle may get reduced such that, after the gear-shift operation has been completed, the velocity of the vehicle has already dropped to an extent where the gears have to be changed down again.

The voltage matching stages DA 1 and DA 2 are shown as operational amplifiers in which the voltage matching may be resistors arranged in the feedback and in the input circuit. It is common knowledge that the amplification factor of an operational amplifier is the quotient of the resistance in the feedback and the resistance in the input circuit. In the case of the voltage matching stage DA 2, the amplification factor is controlled in dependence upon outputs WS 01 to WS 06 of the selector switch memory WS, so that, for each gear to be engaged, the output voltage of the voltage matching stage DA 2 is sufficiently high for comparison of the output voltages of the two voltage matching stages DA 1 and DA 2 to be able to indicate synchronous running of the parts of the gear box to be coupled to one another. The measured variable of the gear box inout speed thus passes through its full voltage range for each gear engaged, although, before voltage matching, the measured variable of the gear box output speed passes through its full voltage range only for the full velocity range of the vehicle which extends over all the gears. Consequently, the measured variable of the gear box output speed has to be amplified to a different extent by the voltage matching stage DA 2 for each gear engaged, so that measured speed variables which can be compared with one another are formed.

Figure 4:
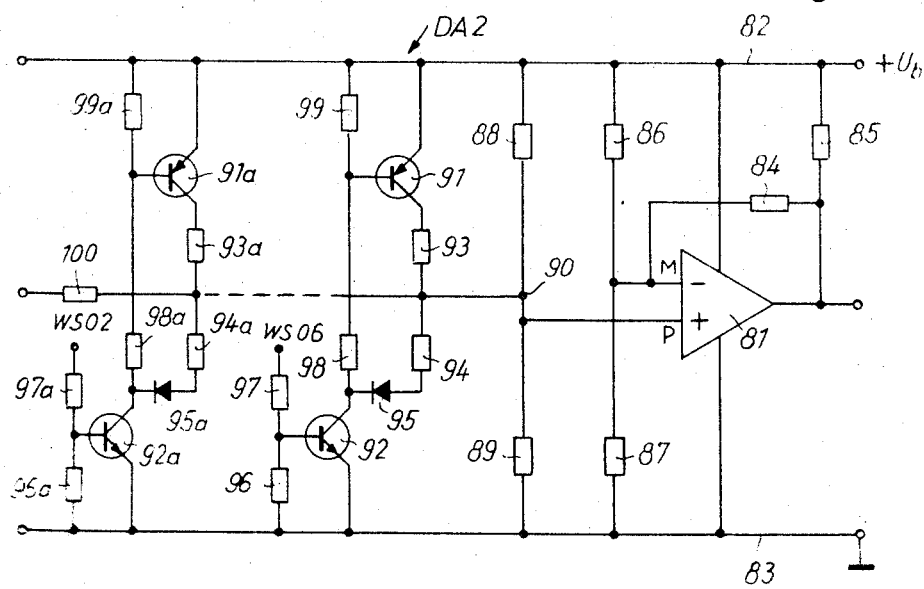
FIG. 4 is the block circuit diagram of a voltage matching stage.

FIG. 4 is a circuit diagram of the voltage matching stage DA 2 having adjustable amplification. The voltage matching stage includes an operational amplifier 81 which is connected to a positive lead 82 and a negative lead 83 for the purpose of supplying it with operating voltage. The positive lead 82 is connected to the source of operating voltage + Ub, and the negative lead 83 is connected to earth. The output of the amplifier 81 corresponds to the output of the voltage matching stage DA 2 and is connected to the two summators 74 and 74a illustrated in FIG. 3. The amplifier 81 comprises a differential amplifier and has a non-inverting input P and an inverting input M. The inverting input M is connected to the output of the amplifier by way of a feed back resistor 84, and the output is also connected to the positive lead 82 by way of a resistor 85. A constant bias potential is also supplied to the inverting input M by means of a voltage divider formed by resistors 86 and 87, the resistor 86 being connected to the positive lead 82 and the resistor 87 being connected to the negative lead 83. Furthermore, a voltage divider fomred by resistors 88 and 89 is connected between the positive lead 82 and the negative lead 83 the noninverting input P of the amplifier 81 being connected to the tapping 90 of the said voltage divider. A number of voltage dividers controllable by way of the selector switch position memory WS are connected in parallel with the voltage divider comprising the resistors 88 and 89. By way of example, a first voltage divider is controllable by the selector switch output WS 06 which corresponds to the sixth gear of the gear box, and comprises transistors 91 and 92 and resistors 93 and 94. The transistor 91 is a p-n-p transistor and the transistor 92 is an N-p-n transistor. When the transistors 91 and 92 are conductive, the resistor 93 is connected in parallel with the resistor 88 at point 90, and the resistor 94 is connected in parallel with the resistor 89. The resistor 93 connects the point 90 to the collector of the transistor 91 whose emitter is connected to the positive lead 82, and the resistor 94 connects the point 90 by way of a diode 95 to the collector of the transistor 92 whose emitter is connected to the negative lead 83. The base of the transistor 92 is connected to the negative lead 83 by way of a resistor 96 and, by way of a resistor 97, to an output of the selector switch position memory, the output WS 06. The collector of the transistor 92 is connectedby way of a resistor 98 to the base of the transistor 91, which base is connected to the positive lead 82 by way of a resistor 99. The figure shows a second controllable voltage divider which is of identical construction but which is connected to a different output of the selector switch position memory, i.e., to the output WS 02. Other controllable voltage dividers (not shown) are similarly connected to the other outputs WS 03 to WS 05. The voltage dividers differ only in the values of the resistors 93, 93a etc. and of the resistors 94, 94a etc. The point 90 is connected by way of a resistor 100 to the output of the low-pass filter 73a illustrated in FIG. 3.

The described arrangement of FIG. 4 operates in the following manner:

The inverting input M of the amplifier 81 is connected to a fixed potential by way of the resistors 86 and 87, and a constant feedback is available by way of the feedback resistor 84. The resistor 85 constitutes the load resistor of the amplifier 81 and the output voltage (the matched gear box output speec voltage) may be tapped therefrom. The fixed voltage divider which is formed by the resistors 88 and 89, and to whose tapping 90 all the other voltage dividers are connected and which is connected to the non-inverting input P of the amplifier 81, defines a working point and fixes voltage matching for the first gear on which the input voltage is lowest. If the selector switch position memory WS indicates the first gear, none of the other controllable voltage dividers is switched on, so that the transistors 91 and 92 are blocked. If the selector switch position memory now indicates that the second gear has been selected, a logic 1 may be taken from its ouput WS 02, i.e., voltage is available at this point. The transistor 92a is then conductive by way of the voltage divider comprising the resistors 97a and 96a. However, if the transistor 92a is conductive, the transistor 91a is also conductive since its base is connected to the negative lead 83 by way of the resistor 98a and the conductive transistor 92a so that the transistor 91a is made conductive. The resistor 93a is now connected in parallel with the resistor 88 by way of the conductive transistor 91a, and the resistor 94a is connected in parallel with the resistor 89 by way of the conductive transistor 92a and by way of the diode 95a.

If the resistor 100 were adjustable it would have an additive influence on the speed variable. If the resistor 84 were adjustable it would have a multiplicative influence on the speed variable. A combined additive and multiplicative influence on te speed variable is however obtained by the effective adjustability of the voltage divider 88, 89 by virtue of the facility for connection of the voltage divider 93, 94 or 93a, 94 or 93a, 94a, etc. in parallel therewith.

The diodes 95 etc., prevent the transistors 91 from becoming conductive by way of the resistors 94 and 98 when the transistor 92 is blocked.

Figure 5:
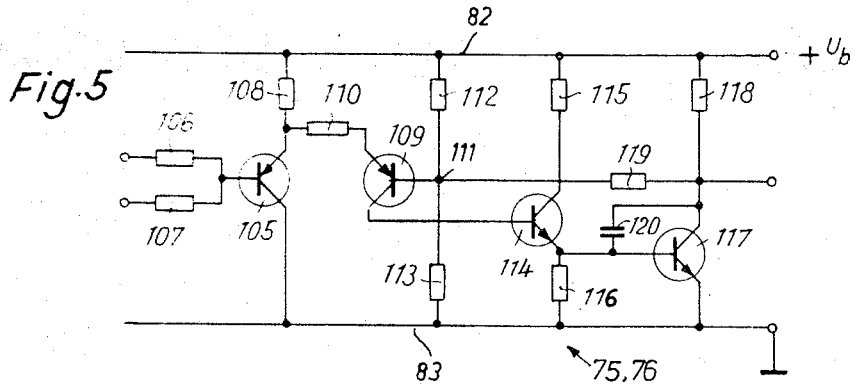
FIG. 5 shows the construction of a Schmitt trigger illustrated in FIG. 3.

FIG. 5 shows a Schmitt trigger 75 or 76 whose input is connected in series with a summing stage 74 or74a of FIG. 3. Two summing resistors 106 and 107 are connected to the base of a transistor 105. The collector of the transistor 105 is connected to the negative lead 83 and its emitter is connected to the positive lead 82 by way of a resistor 108. The emitter of a transistor 109 is connected to the emitter of the transistor 105 by way of a resistor 110. The base of the transistor 109 is connected to the tapping point 111 of a voltage divider formed by resistors 112 and 113. The resistor 112 leads from the point 111 to the positive lead 82, and the resistor 113 leads from the tapping point 111 to the negative lead 83. The base of a transistor 114 is connected to the collector of the transistor 109. The collector of the transistor 114 is connected to the positive lead 82 by way of a resistor 115, and its emitter is connected to the negative lead 83 by way of a resistor 116. The emitter of the transistor 114 is also connected to the base of a transistor 117 whose emitter is connected directly to the negative lead 83 and whose collector is connected to the positive lead 82 by way of a resistor 118. The point 111 is connected to the collector of the transistor 117 by way of a resistor 119. A capacitor 120 is connected between the base and the collector of the transistor 117.

The above-described circuit operates in the following manner:

The base of the transistor 109, connected to the point 111, receives a fixed bias voltage from the voltage divider formed by the resistors 112 and 113. The transistors 109, 114 and 117 form a Schmitt trigger the first amplification stage of which is formed by the transistors 109 and 114 and the second amplification stage of which is formed by the transistor 117, the resistor 119 being connected as a feedback between the collector of the transistor 117 and the base of the transistor 109, which base is also connected to the point 111. The transistor 109 becomes conductive as soon as the voltage on its emitter falls in a positive sense below the voltage on its base. However, when the transistor 109 is conductive, current flows to the base of the transistor 114 so that the transistor 117 also becomes conductive. Before the transistor 117 becomes conductive the voltage on its collector is substantially the voltage of the positive lead 82. When the transistor 117 becomes conductive, its collector assumes substantially the voltage of the earth lead 83. The triggering operation is further assisted by the feedback resistor 119 which seeks to increase the conductivity of the transistor 109 when the transistor 117 becomes conductive. The capacitor 120 acts as a smoothing capacitor. The response threshold of the Schmitt trigger is determined by the magnitude of the resistors 112 and 113 of the base voltage divider of the transistor 109. The total voltage formed on the resistors 106 and 107 controls the transistor 105 which is connected as an emitter-follower and which transmits the summed voltage to the emitter of the transistor 109 in a non-interacting manner. Consequently, the total voltage on the base of the transistor 105 must fall in a positive sense below the voltage on the point 111 if the Schmitt trigger is to relax or be triggered.

Figure 6:
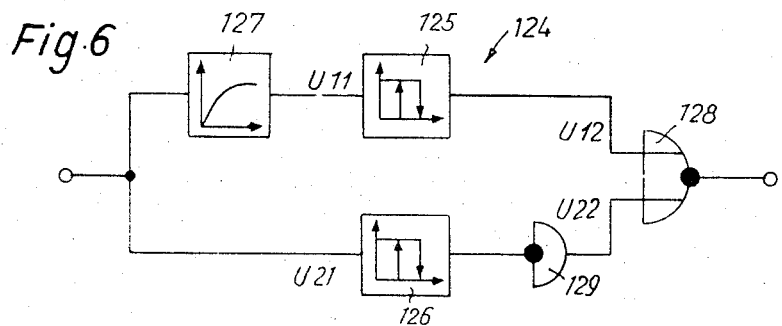
FIG. 6 illustrates a tacho-failure detector of a tacho-failure safety device.

A block circuit diagram of one of two tacho-failure detectors 124 of the tacho-failure safety device GA is illustrated in FIG. 6. The tacho-failure detector 124 includes a first Schmitt trigger 125 and a second Schmitt trigger 126. The input of the first Schmitt trigger 125 is connected to the output of a delay circuit 127. The input of the delay circuit 127 and the input of the second Schmitt trigger 126 are connected to the output of the respective tacho-generator to be monitored, i.e., to the output of the low-pass filter 73 or 73a of FIG. 3. The output of the first Schmitt trigger 125 is connected to an input of a NOR gate 128; the output of the second Schmitt trigger 126 is connected to the input of a negater 129 whose output is connected to the second input of the NOR gate 128. The input voltage of the first Schmitt trigger 125 is designated U11, and the input voltage of the second Schmitt trigger is designated U21. The input voltage on the first input of the NOR gate 128 directly constitutes the output voltage of the first Schmitt trigger 125 and is designated U12, and the input voltage of the second input of the NOR gate 128 corresponds to the inverted output voltage of the second Schmitt trigger 126 and is designated U22. A short pulse is delivered at the output of the NOR gate 128 when the respective tacho-generator fails. This short pulse may be prolonged by way of a holding stage (not illustrated) and serves for further signal processing in the switching logic to produce logic 1 at the output GA 03 of the tacho-failure safety device GA.

Figure 7:
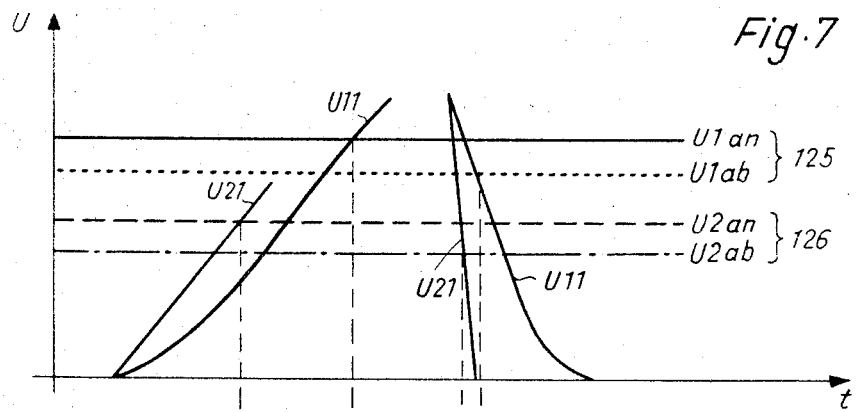
FIGS. 7 an 8 are graphs of the mode of operation of the tacho-failure safety device.
Figure 8:
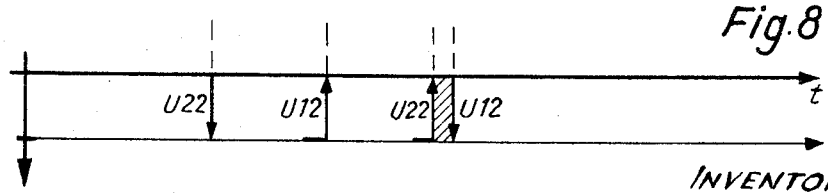

The function of the tacho-failure detector illustrated in FIG. 6 will be further explained with reference to the graphs in FIGS. 7 and 8. The voltages U1an and U1ab are shown by a solid line and a dotted line respectively in FIG. 7. The voltage U1an is intended to represent the response voltage of the first Schmitt trigger 125, and the voltage U1ab is intended to represent the fall-out voltage of the first Schmitt trigger 125. Similarly, the voltage U2an indicated by a dotted line represents the response voltage of the second Schmitt trigger 126, and the voltage indicated by a dash-dot line U2ab shows the fall-out voltage of the second Schmitt trigger 126. Furthermore, it will be seen from FIG. 7 that the response and fall-out voltages of the first Schmitt trigger 125 are above the response and fall-out voltages of the second Schmitt trigger 126. Two input voltages U11 and U21 shown on the left hand side of FIG. 7 appear at the inputs of the two Schmitt triggers 125 and 126 when there appears on the respective tacho-generator being monitored an increasing output voltage which has the shape U21, since the input of the second Schmitt trigger 126 is connected directly to the tacho-generator. However, the tacho-generator detector is not connected directly to the pulse output of the respective tacho-generator but to the direct voltage output of the tacho-generator. The voltage U11 is the voltage which appears at the input of the first Schmitt trigger 125 after delay by the delay circuit 127. Furthermore, it is assumed that the two Schmitt triggers have the outout voltage 1 when in the normal state, and the output voltage 0 when in the triggered state. By way of example, such Schmitt triggers may readily be obtained from an arrangement similar to the arrangement illustrated in FIG. 5. The second Schmitt trigger 126 is triggered as soon as the voltage U21 at the input of the second Schmitt trigger 126 exceeds the response threshold U2an. An output voltage which is inverted by the negater 129 appears at the output of the second Schmitt trigger, so that the voltage U22 jumps from the voltage 0 to the voltage 1 when the second Schmitt trigger 126 is triggered. By virtue of the delay circuit 127, and as a result of the greater response voltage U1an, the first Schmitt trigger 125 is not triggered until the voltage U11 has exceeded its response threshold. Its output voltage U12 then jumps from 1 to 0. The triggered voltages U22 and U12 is indicated by two arrows in FIG. 8. No signal appears at the output of the NOR gate 128 in the example illustrated in the left hand portion of FIGS. 7 and 8, since logic 1 appears on the output of a NOR gate only when logic 0 is present simultaneously on its two inputs. However, if it is now assumed that the input voltage of the tacho-generator failure detector drops very rapidly, for example in the event of a broken lead, the voltage U21 drops considerably more rapidly than the voltage U11 because of the delay circuit 127. The second Schmitt trigger 126 falls out when its input voltage U21 falls below the dash-dot line U2ab. The voltage U22 at the output of the negater 129 then jumps to logic 0 as indicated by the arrow U22 on the right hand side of FIG. 7. The voltage U11 falls below the dotted line U1ab with a time lag relative thereto, so that the voltage U12 jumps from logic 0 to logic 1. Logic 0 is present at the two inputs of the NOR stage 128 in the shaded region located between the arrows U22 and U12 at the right hand side of FIG. 8, so that, by definition, logic 1 then appears at the output of the NOR gate 128, thus indicating tacho-generator failure. The logic convention pertaining to the output voltages of the Schmitt triggers 125 and 126 is so chosen that logic 0 is delivered when a Schmitt trigger of the kind illustrated in FIG. 5 has been triggered.

Logic 0 is then denoted by the trigger output voltage being substantially at earth potential, and logic 1 by a positive signal voltage from the Schmitt trigger.

Figure 9:
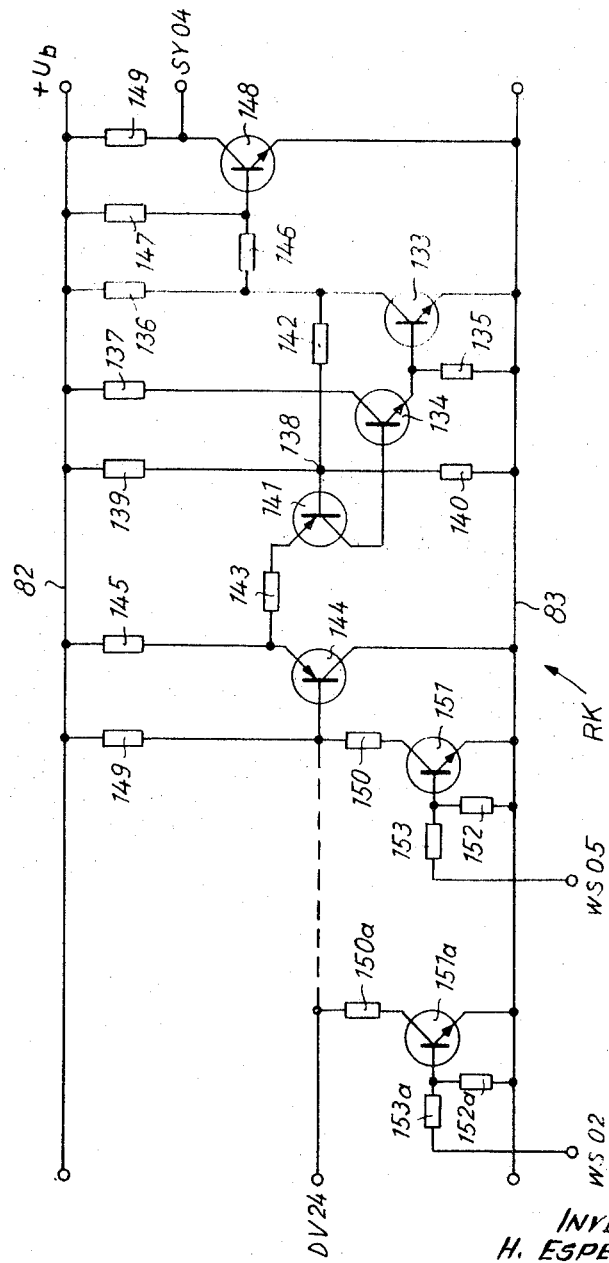
FIG. 9 is the circuit diagram of a change-down blocking trigger stage.

A circuit diagram of the change-down blocking trigger stage RK is shown in FIG. 9. The change-down blocking trigger stage includes a Schmitt trigger which is constructed in a similar manner as the Schmitt trigger illustrated in FIG. 5. However, the switching point of this Schmitt trigger is set at a different value for each gear engaged. This trigger supplies a signal designated SY 04 = logic 1 when the gear box input speed corresponding to the measured gear box output speed in the gear selected or preselected by the position of the selector switch is at or above a value just below the maximum speed of the engine. The Schmitt trigger contains two cascade-connected transistors 133 and 134. The emitter of the transistor 133 is connected to the negative lead 83, and the emitter of the transistor 134 is connected to the negative lead by way of a resistor 135. The collector of the transistor 133 is connected to the positive lead 82 by way of a resistor 136, and the collector of the transistor 134 is connected to the positive lead 82 by way of a resistor 137. A voltage divider formed by resistors 139 and 140 is connected between the positive lead 82 and the negative lead 83, the base of a transistor 141 being connected to the tapping 138 of the said voltage divider. The collector of a transistor 141 is connected to the base of the transistor 134. The transistor 141 constitutes one amplification stage, and the two cascade-connected transistors 133 and 134 constitute the second amplification stage, the amplification stages being connected to form the Schmitt trigger. Feedback is effected by way of a resistor 142. The emitter of the transistor 141 is connected to the emitter of a transistor 144 by way of a resistor 143. The collector of the transistor 144 is connected to the earth lead 83 and its emitter is connected to the positive lead 82 by way of a resistor 145. A voltage divider formed by resistors 146 and 147 is connected between the collector of the transistor 133 and the positive lead 82. The tapping of the voltage divider is connected to the base of a transistor 148 whose emitter is connected directly to the negative lead 83 and whose collector is connected to the positive lead 82 by way of a resistor 149. The transistor 148 inverts the signal which may be tapped from the collector of the transistor 148 in order to obtain a logic value suitable for further signal processing. The transistor 144 is connected as an emitter follower and serves only to control the Schmitt trigger in a non-interacting manner. The base of the transistor 144 is connected to the positive lead 82 vy way of a resistor 149 and, by way of a resistor 150, to the collector of a transistor 151 whose emitter is connected to the negative lead 83. The base of the transistor 151 is connected to the negative lead 83 by way of a resistor 152 and, by way of a resistor 153. to the output WS 05 of the selector switch position memory WS. The output voltage DV 24 of the gear box output tacho-generator DV 2 is applied to the base of the transistor 144. The Schmitt trigger whose amplifier transistors are the transistors 141 and 133, 134 is triggered when the voltage on the emitter of the transistor 141 exceeds the voltage on the base of the latter transistor, so that a positive voltage differential appears between its emitter and its base. When the transistors 133 and 134 are conductive, substantially the voltage $+UB$, i.e., the voltage $S^{104}$ = logic 1, may be taken from the negating stage formed by the transistor 148.

Since the base of the transistor 144, and thus the input of the trigger stage, is connected to the output DV 24 of the gear box output tacho-generator DV 2, a different constant voltage which is added to the voltage DV 24 is required on the base of the transistor 144 for each gear, so that the signal Sy 04 = 1 can always appear shortly before the corresponding gear box input speed at the gear selected or preselected reaches the maximum speed of the engine. In order to indicate the means for changing said constant voltage for each gear, two transistors 151 and 151a are shown and are connected to the selector switch memory outputs WS 05 and WS 02. Similar transistors are connected to the other selector switch memory outputs WS 03 and WS 04.

Figure 10:
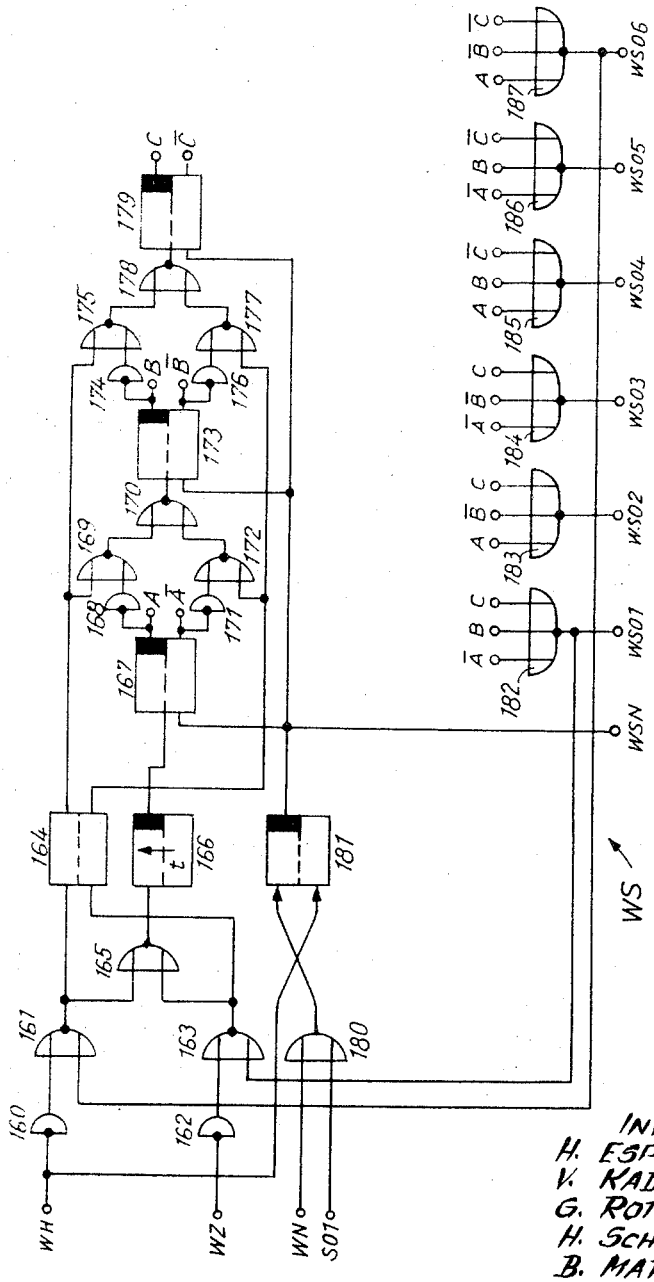
FIG. 10 is a block circuit diagram of a selector switch position memory.

FIG. 10 shows the circuit diagram of the selector switch position memory WS. The selector switch position memory WS is connected to the three contacts WH, WZ and WN of the selector switch W. The contact WH is actuated when changing to a higher gear, the contact WZ is actuated when changing to a lower gear, and actuating the contact WN puts the selector switch position memory in the neutral position. The input WH is connected to an input of a NOR gate 161 by way of a negator 160, and the input WZ is connected to an input of a NOR gate 163 by way of a negater 162. The output of the NOR gate 161 is connected to a first setting input of a bistable trigger stage 164, and the input of the NOR gate 163 is connected to the second setting input of the bistable trigger stage 164. Furthermore, the outputs of the NOR gates 161 and 163 are also connected to two inputs of an OR gate 165 whose output controls a monostable trigger stage 166. The output of the monostable trigger stage 166 controls the pulse input of a bistable trigger stage 167 which, when in its normal state, supplies a signal at the output A and a signal negated relative thereto at the output $\overline{A}$. The output A of the bistable trigger stage 167 is connected by way of a negater 168 to an input of a NOR gate 169 whose second input is connected to one output of the bistable trigger stage 164. The output of the NOR gate 169 is connected to an input of a NOR gate 170. In a manner similar to the output A of the bistable trigger stage 167, the output $\overline{A}$ is connected by way of a negater 171 to an input of a NOR gate 172. The second input of the NOR gate 172 is connected to a second output of the bistable trigger stage 164. The output of the Nor gate 172 supplies the second input signal for the NOR gate 170. The output of the NOR gate 170 is connected to the pulse input of a bistable trigger stage 173. The bistable trigger stage 173 has two complementary outputs B and $\overline{B}$. The output signal at B is reversed in a negater 174, to provide one input signal for a NOR gate 175 whose second input signal is that output signal of the bistable trigger stage 164 which is also fed to the NOR gate 169. The output signal at the output $\overline{B}$ of the bistable trigger stage 173 is fed to a negater 176 which supplies a first input signal to a NOR gate 177. The second input signal for the NOR gate 177 is provided by that output signal of the bistable trigger stage 164 which is also fed to the NOR gate 172. The outputs of the NOR gates 175 and 177 are connected to two inputs of a NOR gate 178 whose output signal controls the pulse input of a bistable trigger stage 179. The bistable trigger stage 179 is of similar construction to the bistable trigger stages 173 and 167 and has outputs C and $\overline{C}$. It is assumed that each of the three bistable trigger stages, when first triggered, adopts a state in which the output denoted by a black area in the circuit symbol in the drawing takes the value logic 1. The selector switch position memory has a further input, the input S 01. A signal appears at S 01 when the supply voltage is switched on. The three bistable trigger stages 167, 173 and 179 behave as a counter which is set to 0 in the first instance by the signal appearing as S 01. The input WN and the input S 01 are connected to the two inputs of an OR gate 180 whose output is connected to the reset input of bistable trigger stage 181. When in a normal state, the bistable trigger stage 181 has logic 1 at its output, as indicated by the black area in the circuit symbol. Its output carries the signal logic 0 during counting. The output of the bistable trigger stage 181 is connected to the reset inputs of the three bistable trigger stages 167, 173 and 179, so that these bistable trigger stages, which constitute the counter, can be set to 0 when a signal appears at the output of the bistable trigger stage 181. This signal appears at the output of the bistable trigger stage 181 when a signal appears wither at WN or at S 01. Six NOR gates 182 to 187, each having three inputs, one input for each of the three bistable trigger stages, are provided as indicated in FIG. 10 for reading the counter 167, 173, 179. Thus, one NOR gate of the NOR gates 182 to 187 is associated with each gear to be selected. The outputs of the NOR gates 182 to 187 are numbered consecutively from WS 01 to WS 06. In addition to this, the selector switch position memory has a further output WSN at which a signal appears when neutral is signalled. This output WSN is connected to the output of the bistable trigger stage 181. The output WS 01 of the NOR gate 182 is connected to the second input of the NOR gate 163, and the output WS 06 of the NOR gate 187 is connected to the second input of the NOR gate 161. It would be possible to use AND gates in place of the NOR gates 182 to 187, the inputs of such AND gates being connected to the outputs of the bistable trigger stages 167, 173 and 179 opposite those indicated in FIG. 10.

The described arrangement operates in the following manner:

The supply voltage for the electronic gear box control system and the auxiliary units has to be switched on before a vehicle can be put into operation. The signal S 01 then appears and controls the monostable trigger stage 181 by way of the OR gate 180 such that a logic 1 appears at the output of the bistable trigger stage 181. This logic 1 constitutes on the one hand the output signal of the output WSN of the selector switch position memory and serves as a neutral signal for the further switching logic and, on the other hand, sets the bistable trigger stages 167, 173 and 179 into an initial state which corresponds to the position 0 of the counter. The pulse input of the bistable trigger stage 167 is controlled by the monostable trigger stage 166 in order to prevent contact chatter resulting in incorrect counter states in the case of direct control by way of the selector switch contacts. If, for example, the gears are changed up from the neutral position, a logic 1 appears at the contact WH. This logic 1 is inverted in the negator 160, so that a 0 appears at the input of the NOR gate 161. The second input of the NOR gate 161 also has a 0, since the output of the NOR gate 187 also has the value 0 in the neutral state. Thus, logic 1 appears at the outpt of the NOR gate 161 and sets the bistable trigger stage 164 such that logic 1 appears at its top output and logic 0 appears at its bottom output. The bistable trigger stage 164 serves as a change-over switch for forward counting or backward counting on the counter, and thus serves as a change-over switch for the counting direction. The gear change direction is thus determined by that output of the change-over switch at which logic 0 appears. Its bottom output has logic 0 when changing to a higher gear, and thus logic 0 is also present at the corresponding inputs of the NOR gates 172 and 177. The monostable trigger stage 166 is triggered by way of the OR gate 165 by the output of the NOR gate 161 at which a logic 1 appears during changing to a higher gear. The output of the monostable trigger stage 166 is connected to the pulse input of the bistable trigger stage 167 and triggers the latter at each pulse. When in the neutral state, the output A had the value logic 0 and the output $\overline{A}$ had the value logic 1. Logic 0 is now present at the output A by virtue of the trigger pulse, so that, as a result of the negater 171, the second input of the NOR gate 172 receives logic 1. The NOR gate 182 is connected such that, in this counter state, logic 1 appears at its output WS 01, which indicates that the selector switch has selected the first gear by way of its contact WH. The bistable trigger stage 181 is set by the change-up pulse such that there appears at its marked output logic 0 which can no longer influence the state of the counter. If, for example, a fresh change-up pulse appears, the bistable trigger stage 167 is triggered anew and logic 1 again appears at its output $\overline{A}$. Owing to the presence of the negater 171, logic 0 is now present at the two inputs of the NOR gate 172, so that logic 1 appears at its output. Thus, the output signal of the NOR gate 172 is changed from logic 0 to logic 1. Since logic 1 is present at the input of the NOR gate 169 by way of the bistable trigger stage 164, the output signal of the NOR gate 169 is permanently 0 when changing to a higher gear. The gear-shift operation changes the output signal of the NOR gate 170 from 1 to 0, since its two inputs were previously at 0 and one of its inputs is now at 1. The bistable trigger stage 173 is triggered by this change, so that the counter has now counted one step further. On the third step of the counter just the trigger stage 167 is triggered to the state in which logic 1 is again present at its output A. On the fourth step the trigger stages 167 and 173 are triggered to their states in which logic 0 appears at their A and B and the change of the output signal of the NOR gate 178 from logic 1 to logic 0 triggers the third trigger stage 179 so that logic 1 appears at its output C. The fifth and sixth steps of the counter are obtained by similar triggering operations. Backward counting is effected in the same manner as the forward counting, except that logic 0 is now present at the inputs of the NOR gates 169 and 175 connected to the bistable trigger stage 164, instead of being present at the NOR gates 172 and 177 as in the case of change to a higher gear. Logic 1 is applied to the NOR gates 172 and 177 by the bistable trigger stage 164 during counting down. Thus, their outputs remain permanently at zero and they cannot produce a counting pulse. The connection of the output WS 06 to the NOR gate 161 prevents the counter from counting on beyond the sixth step and the connection of the output NS 01 to the NOR gate 163 prevents the counter from counting back beyond the first step.

The counter comprising the bistable trigger stages 167, 173 and 179 with its associated gates 169, 170, 172, 175, 177 and 178 is only one of many embodiments of bidirectional counter which may be used in the selector switch position memory WS, as will be readily apparent to those skilled in the art.

Figure 11:
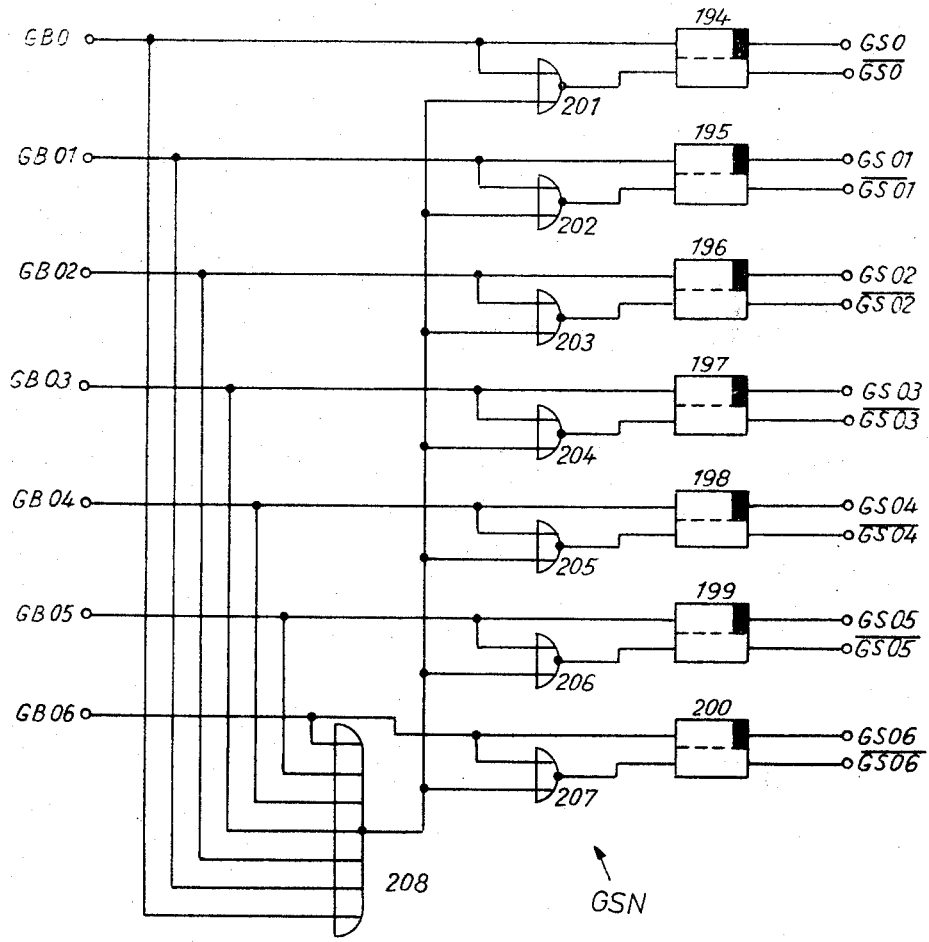
FIG. 11 is a block circuit diagram of a gear box position memory.

FIG. 11 shows the circuit diagram of the gear box position memory GSN. A gear box position switch is connected to each gear of the mechanical stepped change-speed gear box and closes a respective contact when a gear is engaged. In a similar manner as in the case of each gear, a switch is closed when the gear box is in its neutral position. The output signals of these contacts, the neutral signal GBO and the gear box position signals GB 01 to GB 06, are the input signals to the gear box position memory. The gear box position memory has a bistable trigger stage for each input signal. The input signal GBO is fed to the bistable trigger stage 194, and the input signals GB 01 to GB 06 are fed to the bistable trigger stages 195 to 200. Each of the bistable trigger stages has two outputs at which complementary output signals appear. The output signals of the bistable trigger stage 184 are designated GSO and $\overline{GSO}$, and the output signals of the bistable trigger stages 195 to 200 are correspondingly designated GS 01 to GS 06 and $\overline{GS\ 01}$ to $\overline{GS\ 06}$. When the trigger stages 194 to 200 are in their normal states, logic 1 appears at that output of each of the bistable trigger stages 194 to 200 which is marked with an appropriate symbol and logic 0 appears at the other output. The inputs of the bistable trigger stages 194 to 200 to which a signal is applied to bring the trigger stages into their normal states are connected to the gear box position contacts GBO, GB 01 to GB 06. The second inputs of the bistable trigger stages 194 to 200 to which a signal is applied to trigger the trigger stages from their normal states are connected to theoutputs of NOR gates 201 to 207. Each NOR gate 201 to 207 has two inputs. One input ofeach of the NOR gates is connected trthe output of one of the gear box position contacts GBO, GB 01 to GB 06, and the other inputs of the NOR gates 201 to 207 are commonly connected to the output of a further NOR gate 208. The NOR gate 208 has one input for each gear box position switch and is thereby connected to the gear box position switches GBO, GB 01 to GB 06.

The described arrangement operates in the following manner:

The signals which indicate which gear has been engaged may be taken from the outputs GSO and GS 01 to GS 06. In order to explain the mode of operation, it will be asssumed that, in the first instance, the first gear has been engaged. The signal GB 01 is then logic 1 and the output signals of the other gear box position switches GBO and GB 02 to GB 06 are 0. Since GB 01 = logic 1, the bistable trigger stage 195 is triggered into its normal state in w0ich the marked output has a logic 1, i.e., GS 01 = logic 1. Since logic 1 appears at the output of a NOR gate only when all its input signals have assumed the value logic 0, the NOR gate 208 has logic 0 at its output, since one of its input signals, i.e., the signal GB 01, is logic 1. The two inputs of all the NOR gates 201 and 203 to 207 have logic 0, so that logic 1 appears at their outputs. Consequently, the bistable trigger stages 194 and 196 to 200 receive logic 1 at their reset inputs, andlogic 0 appears on their outputs marked by a black area in the circuit symbol. If the gear box position switch GB 01 is now opened during a gear-shift operation, and no other signal appears, all the bistable trigger stages remain in their original positions, since no reset signals appear. The signal for the first gear also remains on the output GS 01 of the bistable trigger stage 195, which indicates that the first gear has been engaged, although the gear box position switch GB 01 has already been opened. Logic 1 appears at theoutpuf of the NOR gate 208 when changing from one gear to another, so that logic 0 appears at the outputs of all the NOR gates 201 to 207, since their input signals have assumed the value logic 1. However, a logic 0 does not influence the state of the bistable trigger stages. It is only when a fresh gear has been engaged (which is signalled by the closing of, for example, the gear box position switch GB 02) that the output signals of all the NOR gates 201 to 207 become logic 1, with the exception of the NOR gate 203 one input of which is connected to the gear box position switch GB 02. The bistable trigger stage 195 is now reset by way of the NOR gate 202, so that logic 0 appears at its preferred output GS 01 and, in lieu thereof, the bistable trigger stage 196 is set so that logic 1 appears at its preferred output GS 02. Thus, when engaging a fresh gear, no memory gaps appear between leaving one gear and closing a fresh gear box position switch.

Figure 12:
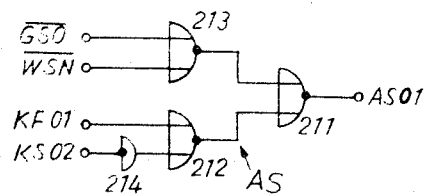
FIG. 12 is the block circuit diagram of a starter blocking device.

The circuit diagram of the starter blocking device AS is shown in FIG. 12. The starter blocking device includes the three NOR gates 211, 212 and 213. The negated output signals $\overline{GSO}$ and $\overline{WSN}$ of the gear box position memory GSN and the selector switch position memory WS form the two inputs of the NOR gate 213. A clutch pedal contact KF 01 (39 in FIG. 1) and a clutch position contact KS 02 (25a in FIG. 1) whose signal is inverted by a negater 214, form the two input signals to the NOR gate 212. The clutch contact KF 01 signals whether the clutch pedal has been depressed by the driver. It is mechanically connected to the clutch pedal and its output signal being logic 1 when the clutch pedal is not depressed. The clutch contact KS 02 indicates whether the clutch has been disengaged and its output signal becomes logic 1 when the clutch is disengaged. The engine starter (not shown) is prevented from operating when the output signal AS 01 of the starter blocking device AS is logic 1. This output signal assumes the value logic 1 when the two input signals of the NOR gate 211 are logic 0. The output signal of the NOR gate 213 is logic 1 only when a neutral signal is present at the gear box position memory GSN and at the selector switch position memory WS. The output signal of the NOR gate 212 is logic 1 only when the clutch pedal contact DK 01 is opened and the clutch contact KS 02 signals that the clutch is disengaged. Thus, the starter blocking device then becomes effective and prevents engine starting either when the gear box position memory does not indicate neutral, or the selector switch position memory does not indicate neutral, or, the gear box position memory and the selector gear position memory do not indicate neutral; and, when the clutch pedal contact KF 01 is closed, the clutch position contact KS 02 does not signal that the clutch has been engaged or KF 01 and KS 02 do not signal that the clutch has been engaged or KF 01 and KS 02 are present simultaneously. It will be appreciated that it is precisely in such a case as this that different circuit combinations are conceivable. For example, an OR gate can be used instead of the NOR gate 211 and the four input signals are then combined in a different manner.

Figure 13:
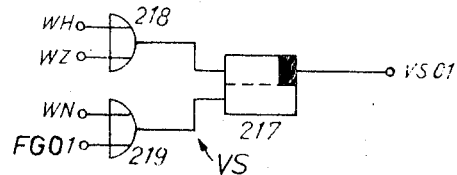
FIG. 13 is a block circuit diagram of a preselector memory.
Figure 14:
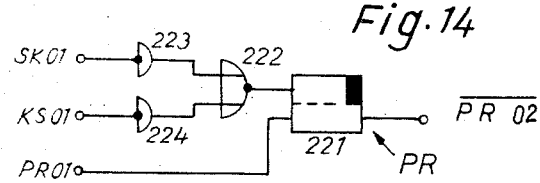
FIG. 14 is a block circuit diagram of a pressure-failure memory.

FIG. 13 shows the circuit diagram of the preselector memory VS. The preselector memory VS includes a bistable trigger stage 217 which has an output which is marked by a black area and the defined normal state of which is logic 1. The output signal of the preselector memory, designated VS 01, is taken from the marked output. That input of the bistable trigger stage which triggers the output, marked by the black area, into its normal state is connected to an OR gate 218 whose input signals constitute the change-up signal WH and the change-down signal WZ of the selector switch position memory WS. The second input of the bistable trigger stage 217 is connected to an OR gate 219 whose input signals constitute the signal WN of the selector switch for placing the selector switch position memory WS in the neutral state, and a signal FG 01. FG 01 is logic 1 when the release contact FG, which is located on the selector switch and which was not shown in the previous Figures, is closed. Further gear change cannot be effected provided VS 01 — logic 1, which is manifested by the connection of the preselector memory VS to the gear-shift command generating circuit SK. VS 01 is logic 1 immediately after each actuation of the change-up or change-down switch VS 01 or VS 02, and a gear-shift command cannot be produced. The bistable trigger stage 217 is reset only when the release contact FG is closed so that VS 01 can appear. However, a gear change to neutral is immediately effected by the switching logic without waiting for closure of the release contact FG, since the bistable trigger stage 217 is always reset by the signal WN = logic 1, so that VS 01 = 0 appears. Consequently, the gear box can always be put into neutral without a time lag. This is particularly important in the event of a fault if, for example, an incorrect gear has been engaged and not the desired gear. By way of example, an incorrect gear change can occur when changing to the succeeding higher gear if, for any reason, an even higher gear is engaged instead of the immediately succeeding gear. The danger arising from skipping a gear cannot arise when changing down, since the change-down blocking trigger stage RK would respond in order to protect the engine against possible overspeeding.

Figure 15:
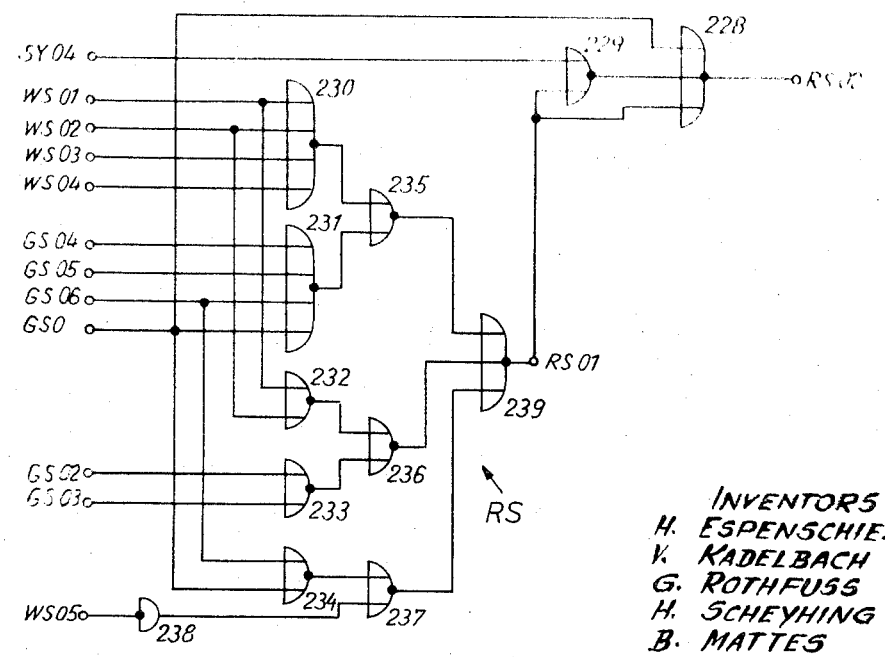
FIG. 15 is a block circuit diagram of a change-down monitoring circuit.

The block circuit diagram of the system pressure monitoring circuit or pressure failure memory PR is illustrated in FIG. 15. The pressure failure memory includes a bistable trigger stage 221 having two inputs. When in its normal state, the output indicated by a black area has logic 1, i.e., when the bistable trigger stage has been triggered by logic 1 at the appropriate input. The pressure failure signal $\overline{PR\ 02}$ is taken from the inverted output. The input which controls the inverted output from which the signal $\overline{PR\ 02}$ is taken is connected to the pressure switch (31 in FIG. 1) whose output signal PR 01 indicates whether there is a loss of pressure in the hudraulic system. The pressure loss is defined such that PR 01 has logic 1. The second input of the bistable trigger stage 221 is connected to the output of a NOR gate 222 having two inputs. One input of the NOR gate 222 is connected to the output of the gear-shift command generating circuit SK by way of a negater 223, as indicated by the symbol SK 01. The second input of the NOR gate 222 is connected by way of a negater 224 to the clutch contact KS 01 which indicates whether the clutch has been disengaged.

The described arrangement operates in the following manner:

A pressure drop is signalled by a logic 1 at $\overline{PR\ 02}$ when the bistable trigger stage 221 is triggered by a signal PR 01 = logic 1. However, PR 01 = logic 1 can trigger the bistable trigger stage 221 immediately only when a logic 0 is present at its other input. Logic 1 is present at the output of the NOR gate 222, and at the preferred input of the bistable trigger stage 221 connected thereto, when the two input signals of the NOR gate 222 are logic 0. Owing to the negaters 223 and 224, the two input signals of the NOR gate 222 have logic 0 when a gear-shift command exists, which is indicated by SK −1 = logic 1, and when the clutch is engaged, which is indicated by KS 01 = logic 1. Consequently, a pressure loss is signalled immediately by $\overline{PR\ 02}$, provided no gear-shift command exists and the clutch is not disengaged. If a gear-shift command exists, the pressure loss is signalled only when the gear-shift command is terminated and the clutch has again been engaged. This arrangement is intended to ensure that, in the case of a pressure loss, a gear-shift operation which has been commenced can still be completed in so far as this is permitted by the residual pressure still present in the hydraulic system, even though a pressure loss has already been signalled. Thus, if a pressure loss occurs in the hydraulic system during a gear-shift operation, a gear-shift operation which has been commenced will, as far as possible, still be carried out before a further gear-shift is prevented by the signal $\overline{PR\ 02}$ = logic 1, so that the vehicle will not suddenly be deprived of motive power or braking by the engine in a critical travelling situation. The pressure loss remains signalled until PR 01 again indicates the existence of full pressure in the system.

Figure 16:
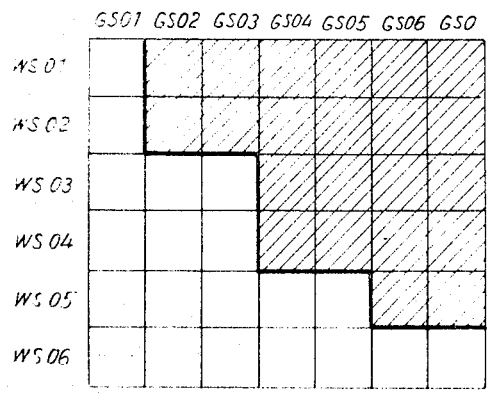
FIG. 16 is a Karnaugh diagram relating to the circuit of FIG. 15.

The circuit diagram of the change-down monitoring circuit RS is illustrated in FIG. 15. The change-down monitoring circuit logically processes all signals by which, in principle, it is possible to effect a change-down operation. The switching functions formed from the output signals of the selector switch position memory WS and the gear box position memory GSN for a possible change-down operation are combined in the nature of a Karnaugh diagram in FIG. 16. The hatched areas in FIG. 16 constitute the logic 1 conditions for a change-down operation. The switching functions to obtain the output RS 01 in accordance with FIG. 16, are achieved by NOR gates as shown in FIG. 15. Output RS 01 = logic 0 signifies that a change-down operation is being performed, as RS 01 — logic 1 consequently signifies that a change-down operation is not being performed. Furthermore, for the signal that a change-down operation cannot be synchronized, it is further taken into account in FIG. 15 that the engine must not be over-sped, which is indicated by the signal SY 04 = logic 1 from the change-down blocking trigger stage RK. The signal RS 02 = logic 1 indicates that a change-down operation cannot be synchronized or carried out.

The signal RS 02 appears at the output of a NOR gate 228 arw three inputs of which are the signals GSO (from the gear box position memory GSN) and RS 01 and the output signal of a NOR gate 229. The input signals of the NOR gate 229 are the signals SY 04 and RS 01. The signals WS 01 to WS 04 from the selector switch position memory WS are fed to a NOR gate 230. The signals GS 04 to GS 06 and the signal GSO are fed to a NOR gate 231. The signals WS 01 and WS 02 are fed to a NOR gate 232, the signals GS 02 and GS 03 are fed to a NOR GATE 233, and the signals GS 06 and GSO are fed to a NOR gate 234. The outputs of the NOR gates 230 and 231 form the inputs of a NOR gate 235. The outputs of the NOR gates 232 and 233 are the inputs of a NOR GATE 236. The NOR gate 234 is connected to one input of a NOR gate 237 the second input of which receives the signal WS 05 by way of a negater 238. The outputs of the NOR gates 235, 236, 237 form three inputs of a NOR gate 239 from the output of which may be taken the signal RS 01. The signal RS 02 is obtained from the signals RS 01, SY 04 and GSO as already described. It should not be possible to effect a change-down operation when RS 01 is logic 1, which indicates that, in switching logic language, a changedown operation does not exist, or if the engine would be oversped when changing down, which is indicated by SY 04 = logic 1. A further input on the NOR gate 228 is fed with the signal GSO. Thus, RS 02 = logic 0 as soon as the gear box is in the neutral position. It is nonetheless conceivable for SY 04 to become logic 1 during the course of a change-down operation, but it would be dangerous to block the gear-shift command when changing down on a gradient. Thus engagement of a fresh gear when the gear box has attained the neutral position is not prevented because GSO = logic 1 to prevent RS 02 = logic 1.

The hatched region in the Karnaugh diagram illustrated in FIG. 16 represents the logic conditions which characterize a change-down operation, i.e., the relationship between RS 01 and the inputs WS 01 to WS 06, GS 01 to GS 06 and GSO. As will be apparent to those skilled in the art, the NOR gates 230 to 237 and 239 and the negater 238 achieve this relationship. For the purpose of simplifying the gear-change logic function, the individual areas for the logic change-down operations have been supplemented by areas which do not affect the logic statements, i.e., do not correspond to change-down operations.

It is possible for the change-down monitoring circuit RS illustrated in FIG. 15 to be replaced by a much simpler circuit in which the signal RS 02 is obtained at the output of a NOR gate whose first input receives the signal SY 04 via a negater and whose second input receives the signal GSO.

Figure 17:
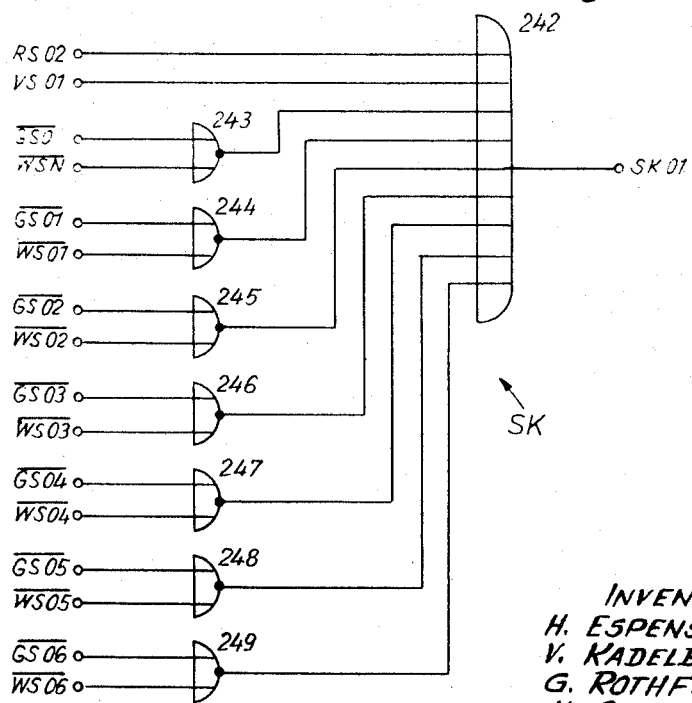
FIG. 17 is a block circuit diagram of a gear-shift command generating circuit.

The circuit diagram of the gear-shift command generating circuit SK is illustrated in FIG. 17. The gear-shift command generating circuit contains an OR gate 242 to the inputs of which are fed the signals RS 02, VS 01 from the change-down monitoring circuit RS and the preselector memory VS and the output signals from NOR gates 243 to 249. The input signals of the NOR gate 243 are GSO and WSN, the negated neutral signals of the gear box position memory GSN and the selector switch position memory WS. The negated output signals of the gear box position memory and the selector switch position memory GS 01 to GS 06 for the first, second, third, fourth, fifth and sixth gears are fed respectively to the NOR gates 244 to 249. Thus, the storage locations for the same gear box steps are compared with one another at each gate.

The described arrangement operates in the following manner:

A gear shift command is generated when the memory states of the selector switch position memory WS and the gear box position memory GSN do not coincide, and SK 01 (the output signal of the OR gate 242) becomes logic 0. The signals RS 02 and VS 01 supplied produce logic 1 for SK 01 at the output of the OR gate 242 when they have the value logic 1. This means that a gear-shift command cannot be produced either when it is signalled by way of RS 02 that a change-down operation cannot be carried out or when a gear-shift command is blocked by way of VS 01 during gear change with preselection.

FIG. 18 shows the circuit diagram of the gear-change circuit GW. The output signal ZV 01 of the gear-change circuit energizes the disengaging valve ZV which forms part of the hydraulically operating gear-shift device and which, when triggered, puts the gear box into its neutral position. Furthermore, the output signals EA 01 to EA 06 control the solenoid valves EA by way of corresponding output stages which, in the case of the gear-shift device, engage the gears 1 to 6 by the filling of corresponding actuating cylinders with hydraulic medium. Two signals designated MKS 1 and EK 01 are fed to a NOR gate 255. The generating of these two signals by the clutch actuating circuit KD and the synchronizing aids control circuit VRX will be further described hereinafter; MSK 1 = logic 1 signifies that the automatic clutch actuating arrangement has been triggered, and EK 01 — logic 1 signifies that the gear box is in its neutral position and a change-down operation is being performed. The output signal of the NOR gate 255 is fed to a further NOR gate 256 to which are also fed, as input signals, the output signals SK 01 of the gear-shift command generating circuit SK the output signal PR 02 of the pressure failure memory PR, and the signal GA 03 which indicates whether the tacho-generator failure safety device GA has responded to failure of one of the tacho-generators DV 1 and DV 2. The disengaging value ZV is energized by the output signal ZV 01 = logic 1 of the NOR gate 256. The output of the NOR gate 256 is also connected to one input of a NOR gate 257 the second input of which is connected to the output of a monostable trigger stage 258. The input signal which triggers the monostable trigger stage 258 is the output signal of the NOR gate 256 after passing through a negater 259. The output signals EA 01 to EA 96, each of which engages one gear, are produced by NOR gates 260 to 266. Each of the NOR gates 260 to 266 has two inputs. One input of each NOR gate 260 and 266 is connected to the output of an OR gate 267 whose input signals are the signal PR 02, the signal SY 03 from the synchronizing circuit arrangement SY, the output signal of the NOR gate 257 and the output signal of an intermediate memory 268. The reset input of the intermediate memory 268 is connected to the output of a 01, gate 269 to which the signal SK 1, the negated output signal of the NOR gate 256 for the disengaging valve, and the negated neutral signal GSO of the gear box position memory GSN are fed as input signals. A signal at the setting input of the intermediate memory 268 triggers the latter into its normal state and this setting input is connected to the output of the NOR gate 257. The output signal EA 01 of the NOR gate 260 effects engagement of the first gear, the second input of the NOR gate 260 being connected to the output WS 01, the negated output signal of the selector switch position memory WS for the first gear. The output signal EA 02 of the NOR gate 261 effects engagement of the second gear, the second input of the NOR gate 261 being connected to the output $\overline{\text{WS 02}}$ of the selector switch position memory. The outputs $\overline{\text{WS 03}}$ and $\overline{\text{WS 06}}$ are connected respectively to the second inputs of the NOR gates 262 to 266.

The described circuit operates in the following manner:

The gear-shift valves EA, which are opened by the signals EA 01 to EA 06, receive their control signals in dependence upon the negated signals of the selector switch position memory WS in order to fulfill the triggering conditions for the NOR gates 260 to 266 whose output signals can assume the value logic 1 only when their two input signals are 0. Thus, the gear-shift valves EA are actuated only when a logic 0 is present on the selector switch position memory WS at the negated output for the relevant gear, and when the output signal of the OR gate 267 is also 0. However, the output signal of the OR gate 267 can become 0 only when all its input signals are 0. Consequently, the signal $\overline{\text{PR 02}}$ of the pressure failure memory PR must be logic 0, the signal SY 03 of the synchronizing circuit arrangement SY must be logic 0, and the output signal of the NOR gate 257 and the output signal of the intermediate memory 268 must also be 0. During synchronous running, the signal SY 03 (one output signal of the synchronizing circuit arrangement SY) is logic 0. Provided the disengaging valve is energized (ZV 01 = logic 1) the output signal of the negater 259 is logic 0. Consequently, the monostable trigger stage 258 is not yet triggered and its output signal is also logic 0. Since logic 1 is present on one of the inputs of the NOR gate 257 by way of the signal ZV 01 — logic 1, the output signal of the NOR gate 257 is 0 provided the disengaging valve ZV is energized. The output signal of the NOR gate 269 is logic zero for initiating a gear engaging operation, since the output signal SK 01 of the gear-shift command generating circuit SK has the value logic 0, and one of the inputs of the NOR gate 269 is connected to the output of the negater 259 and $\overline{\text{GSO}}$ also has the value zero when the gear box has reached its neutral position. Consequently, the intermediate memory 268, which is in the form of a bistable trigger stage, is reset by the output signal on the NOR gate 269, so that logic 0 also appears on its output which is connected to the OR gate 267. As soon as the disengaging valve ZV is switched off after completion of the gear-shift operation, i.e., ZV 01 becomes logic 0, logic 1 appears at the output of the negater 259. This logic 1 changes the monostable trigger stage 258 from its normal state into its unstable state, so that for the duration of the unstable state logic 1 appears on the output to which the NOR gate 257 is connected. Consequently the output signal of the NOR gate 257 is zero for the duration of the unstable state of the mono-stable trigger stage 258 after the disengaging valve ZV has been switched off. The output signal of the negater 259 is fed to the NOR gate 269 at the output of which appears a logic 0 after the disengaging valve ZV has been switched off. However, this logic zero does not influence the intermediate memory 268. Logic 0 is present at the two inputs of the NOR gate 257 only when the monostable trigger stage 258 has relaxed into its stable state, so that the output signal of the NOR gate 257 now becomes 1. Thus, logic 1 appears on one input of the OR gate 267 only after the monostable trigger stage 258 has relaxed, and is transmitted to the output of the OR gate 267. However, as soon as logic 1 appears at the output of the OR gate 267, none of the output signals EA 01 to EA 06 of the NOR gates 260 to 266 can have the value logic 1. The gear-shift valve EA which was opened to engage a gear is thereby switched off only after the monostable trigger stage 258 has relaxed. Thus, the signals EA 01 to EA 06 are maintained longer than the signal ZV 01 for the disengaging valve by a period equal to unstable or relaxation period of the monostable trigger stage 258. This prolongation of the signals EA 01 to EA 06 ensures that a selected gear remains in engagement and that the gear box does not remain in its neutral position or return to its neutral position owing to the disengaging valve Zv being still switched-on. The intermediate memory 268 is required in order to prevent a gear-shift operation from being terminated by the output signals of the NOR gate 269 as soon as a neutral signal no longer exists, i.e., as soon as the signal $\overline{\text{GSO}}$ assumes logic 1 although a fresh gear has not yet been securely engaged. Thus, the intermediate memory prolongs the GSO signal until the intermediate memory is reset by the output signal of the NOR gate 257. This occurs after the expiry of the unstable period of the monostable trigger stage 258. The disengaging valve ZV is energized when pressure is present in the hydraulic system, when the tacho-generator failure safety device GA has not responded, and when the clutch is energized or a change-down operation is indicated by way of EK 01. The gear-engaging valves EA may be triggered when the selector switch position memory WS in the appropriate state on the one hand and, on the other hand, logic 0 is present at the output of the OR gate 267 is a further triggering condition for the gear-engaging valves EA. These triggering conditions mean that pressure is present in the hydraulic system, that the tacho-generator failure safety device Ga has not responded, that a synchronizing signal exists, and that the disengaging valve is energized. The signal that the disengaging valve is energized is prolonged beyond the switch-off instant of the disengaging valve by a period equal to the unstable period of the monostable trigger switch 258.

The circuit diagram of the clutch actuating circuit KD is illustrated in FIG. 19. The clutch actuating circuit has three NOR gates 275, 276 and 277. The signal MKS 1 appears at the output of the NOR gate 275 and has the effect of energizing the clutch actuating valve MKS for rapidly disengaging the clutch by means of a hydraulic piston. The input signals of the NOR gate 275 are the output signals GA 03 of the tacho-generator failure safety device GA, a signal X 01 which is logic 1 when the vehicle is not stationary and which is negated in a negater 278, the output signal KF 01 of the clutch pedal contact which is negated in a negater 279, the signal PR 02 from the pressure failure memory PR, the signal EK 01 from the synchronizing aids control circuit VRX and the signal SK 01 from the gear-shift command generating circuit SK. The input signals of the NOR gate 276 are the output signal of the NOR gate 275, the output signal of the negater 279, the output signal $\overline{\text{PR 02}}$, the signal EK 01, the neutral signal WSN of the selector switch position memory WS, and the output signal KS 01 of the clutch position contacts KS. The output signal of the NOR gate 276 in MDS 2. The output signal of the NOR gate 277 is the signal MDS 2 of the NOR gate 276, negated in a negater 280, and the output signal of the monostable trigger stage 281 which is triggered by the output signal of the NOR gate 276, i.e., by MDS 2.

The described arrangement operates in the following manner:

The clutch is moved rapidly by the signal MKS 1 = logic 1 which can be produced when all the input signals of the NOR gate 275 have logic 0. Consequently, the clutch can be disengaged when the tacho-generator failure safety device GA has not responded, when the vehicle is not stationary, which is signalled by X 01 after negating, when the foot-operated clutch pedal has not been actuated, which is signalled by the negating of the clutch pedal contact signal KF 01, when pressure is available in the hydraulic system, as indicated by $\overline{PR\ 02}$, when a gear shift command exists, as signalled by SK 01, and during change-down operations, until a clutch reengagement signal appears, i.e., so long as EK 01 is still 0. the clutch remains disengaged provided MKS 1 = logic 1. The clutch is re-engaged by damping the movement of a hydraulic piston, actuating the clutch, by means of the throttle valve MDS which can be connected into the flow of hydraulic medium. This throttle valve which effects slow re-engagement of the clutch is switched on by the signal MDS 1 = logic 1. The signal MDS 1 — logic 1 appears later than the output signal of the NOR gate 276, i.e., the signal MDS 2, by a period equal to the unstable period of the monostable trigger stage 281. The throttling signal MDS 2, i.e., the output signal of the NOR gate 276, appears when pressure is available in the hydraulic piston, when the foot-operated clutch pedal has not been actuated, when the clutch has not been energized, the clutch does not signal engaged, when the selector switch is not in its neutral position, and when the signal EK is still at logic 0. Owing to the monostable trigger stage 281, the signal MDS 1 = logic 1 appears later than the signal MDS 2 = logic 1 by an amount equal to this unstable period. Consequently, the clutch is disengaged without a time lag, i.e., as a direct reaction to MKS 1. MKS 1 becomes logic 0 and MDS 2 becomes logic 1 in the first instance when a signal for re-engaging the clutch appears after the clutch has been disengaged. The clutch is re-engaged very rapidly provided the throttle valve MDS has not yet been triggered, and provided MDS 1 is logic 0 and MKS 1 is also logic 0. Thus, the clutch is rapidly engaged for the duration of the unstable period of the monostable trigger stage 281 and is slowly engaged only after the monostable trigger stage has relaxed and the signal MDS 1 for switching on the throttle valve MDS can be produced. Thus, during an engaging operation, the clutch rapidly effects its idle travel before it commences to engage and, after it commences to engage, slowly re-establishes the frictional connection between the engine and the gear box.

FIG. 20 shows a circuit diagram of the synchronizing aids control circuit VRX. The synchronizing aids controlled by this circuit are the lay shaft brake VG, the engine brake MB, and the fuel regulator RE for increasing or decreasing the engine speed during a gear-shift operation. Furthermore, the synchronizing aids control circuit produces the signal EK 01 which initiates reengaging of the clutch during change-down operations, and switches off a foot-operated contact, by which the driver can arbitrarily operate the engine brake. All the pedal cut-out devices are shown by a block PN in the block circuit diagram in FIG. 2. The pedals which are to be arbitrarily operated by the driver, other than the wheel brakes, are always put out of action when clutch actuating signals or output signals of the synchronizing aids control circuit appear during a gear-shift operation. This is effected simply by changing over from arbitrarily controllable operation to automatically controlled operation, for example in the manner in which, in FIG. 20, the operating contact 299 for the engine brake is switched off.

The synchronizing aids control circuit includes a NOR gate 285 which controls the lay shaft brake VG when its output signal VB 01 assumes logic 1. The input signals of the NOR gate 285 are the output signal WSN of the selector switch position memory WS, the signal KS 02 of the clutch position contacts negated in a negater 294, the output signal SY 03 of the synchronizing circuit SY, after it has passed through the negater 286, the negated output signal $\overline{GSO}$ of the gear box position memory GSN, the output signal SK 01 of the gear-shift command generating circuit SK, and the signal EK 01 which appears at the output of a bistable trigger stage 287. The setting input of the bistable trigger stage 287, by which the output marked by a black area in the circuit symbol is set to logic 1 when the setting input is triggered by logic 1, is connected to the output of a NOR gate 288 at which appear as input signals the signal SK 01, the signal $\overline{GSO}$, the negated signal SY 03 from the output of the negater 286, and the negated signal SY 01 which is inverted in a negater 289. The reset input of the bistable trigger state 287 changes over the bistable trigger stage, when triggered by logic 1 so that logic 0 appears at the marked output of the trigger stage, and is connected to the output of an OR gate 290. The signal SK 01, the signal SY 02 and the signal X 01 inverted in a negater 291 are fed as input signals to the OR gate 290. Furthermore, the synchronizing aids control circuit includes a NOR gate 292 to which are fed as input signals the signal WSN, the signal SK 01, the negated signal SY 01 and the output signal of a NOR gate 293. The signal EK 01 which appears at the output of the bistable trigger stage 297 and the signal KS 02 of the clutch position contacts KS are fed to the NOR gate 293. Logic 1 at KS 02 signals that the clutch is disengaged. The signal KS 02 negated in the negater 294 is fed to a NOR gate 295 which produces a signal MB 01 at its output. If MB 01 is logic 1, the engine brake is triggered. The signal WSN, the signal SK 01, the signal SY 01, the negated signal X 01, and the negated signal KS 02 are fed as input signals to the NOR gate 295. The signal SK 01 is inverted in a negater 296 to produce the signal MB 02 which actuates a relay 297. The relay 297 has a normally closed contact 298 which interrupts the line between an engine brake foot-operated contact 299 and a solenoid valve 300 for switching on the engine brake. Furthermore, the output signals of the NOR gates 295 and 292 are fed to an OR gate 301 from whose output may be taken the signal RE 01 which controls the fuel regulator together with the output signal MB 01.

The described arrangement operates in the following manner:

The signal EK 01 — logic 1 effects the re-engagement of the clutch during change-down operations. It appears when a gear-shift command exists, i.e., when SK 01 is logic 0, when the gear box is in its neutral position, i.e., when $\overline{GSO}$ = logic 0, and when the signal SY 01 indicates that the gear box input is too slow, and when the negated signal SY 03 — 1 indicates that a synchronizing signal does not exist. The signals SY 03 and SY 01 are inverted in the negaters 286 and 289. Thus, all the input signals at the NOR gate 288 are 0 for EK 01. The output signal of the NOR gate 288 puts the bistable trigger stage 287 into its normal state in which logic 1 appears at the output marked by a black rectangle. The signal EK 01 is taken from the output of the bistable trigger stage 287. As already explained above, the signal EK 01 is required for the clutch actuating circuit and for the gear-shift circuit. EK 01 = logic 1 effects rapid re-engagement of the clutch during change-down operations as soon as the gear box is in its neutral position after the previous gear has been disengaged. During change-down, each fresh gear can be engaged with the clutch engaged after the gear box parts to be connected are running substantially synchronously. Thus, the period required for a gear change during change-down is shortened by the duration of a complete clutching operation. Logic 0 appears at the marked output of the bistable trigger stage 287 when logic 1 is fed to the reset input of the trigger stage 287 by the OR gate 290. This is the case when one of the input signals of the OR gate 290 assumes the valve 1, i.e., either when the signal X 01 becomes logic 0 so that it becomes X 01 = logic 1 after passing through the negater 291 which signifies that the vehicle is not stationary, when SY 02 signals that the gear input is too fast, that the parts to be connected are running supersynchronously, or when SK 01 = logic 1 signals that the gear-shift command has been carried out, i.e., that a gear-shift command no longer exists. The use of a bistable trigger stage as a memory is necessary to prevent the synchronizing aids from being switched off by alteration of the signal $\overline{GSO}$ between the neutral signal and the signal that the gear-shift operation has terminated and a fresh gear has been engaged When SY 02 — logic 1 signals that the parts to be connected are running super-synchronously, i.e., that the gear box input shaft is rotating too rapidly, it is necessary to suppress the signal EK 01 — logic 1 if, during change-down, the gear box input has been accelerated beyond the synchronizing point by means of the synchronizing aids without it having been possible to engage into the selected gear. In this state, as in the case of a change-down operation, the gear box input shaft rotating too rapidly is decelerated. The lay shaft brake VG can be triggered only when VG 01 = logic 1 appears at the output of the NOR gate 285. However, an output signal can appear here only when all the input signals are logic 0. This is the case when WSN is logic 0, the selector switch position memory indicates the neutral has not been selected, when SY 03 = logic 1, which takes effect on the NOR gate 285 as logic 0 by way of the negater 286, i.e., when synchronous running does not exist, when the gear box is in its neutral position, i.e., when GSO = logic 0, and when the clutch position contact KS 02 = logic 1 signals that the clutch has been disengaged. The lay shaft brake is switched off provided synchronous running has occurred and SY 03 has thus signalled. The requirement that a gear-shift command must exist, which is indicated by SK 02 = logic 0, is a safety requirement. The relay or valve 300 for actuating the engine brake responds when all input signals of the NOR gate 295 have the valve logic 0. Thus, MB 01 is logic 1 when the gear box input shaft is rotating too rapidly during change to a higher gear, i.e., when SY 01 has the valve logic 0, when the selector switch position memory WS is not in its neutral position, indicated by WSN = logic 0, when the vehicles is not stationary, signalled by $\overline{X\,01}$ = logic 0, and when a clutch position contact signals that the clutch is disengaged, i.e., when $\overline{KS\,02}$ = logic 0 is signalled, and when SK 01 = logic 0 indicates that a gear-shift command exists. When a gear-shift command is produced by SK 01 = logic 0, inversion of SK 01 in the negater 296 produces a signal which then assumes the value logic 1 and which triggers the relay 297 so that the normally-closed contact 298 of the relay 297 is opened. Thus, the foot-operated contact 299 for actuating the engine brake is switched off and has no further influence on the position of the engine brake. In addition to actuating the engine brake, the signal MB 01 = logic 1 also causes the fuel regulator greatly to reduce the fuel supply to the engine, so that the speed of the engine is reduced. The fuel regulator is connected to the gear box control device by way of the signals RE 01 and MB 01. RE 01 appears as the output signal of the OR gate 301 whose input signals are the output signals of the NOR gates 292 and 295. The output signal of the NOR gate 295 is the signal MB 01. When RE 01 — logic 1, and MB 01 — logic 1, this signifies a reduction in the speed of the engine, which is further assisted by actuating the engine brake. However, if MB 01 = logic 0 and an output signal appears only at the NOR gate 292, this signifies that the speed of the engine is being increased, i.e., that intermediate acceleration is being automatically effected in order to match the speeds of the parts of the gear box to be coupled to one another. RE 01 = logic 1 appears when all the input signals at the NOR gate 292 are 0. Thus, for RE 01 = logic 1, WSN = logic 0 must indicate that the selector switch position memory is not in its neutral position, SY 01 — logic 1, which is inverted in the negater 289, must signal that a change down operation exists with sub-synchronous running of the parts to be connected, SK —1 = 0 must indicate that a gear-shift command is in existence, and the output signal of the NOR gate 293 must indicate that the clutch has been disengaged, which is indicated by the clutch position contact KS 02 = 1, or that a clutch re-engaging signal exists during change-down, which is signalled by way of EK 01 = 1.

What is claimed is:

1. An automatic gear change system for automatically actuating gear-shift devices of a stepped change-speed gear box of an engine driven motor vehicle having a clutch means at an input shaft of the gear box, comprising: monitoring means for measuring input and output speeds of the stepped change-speed gear box to facilitate synchronous running of input and output transmission shafts to be coupled to each other, synchronizing aid means controlled by said monitoring means and provided for expediting synchronous running of said transmission shafts, said synchronizing aid means including a fuel regulator for controlling the engine speed during a gear changing operation, and engine brake, and another brake for directly braking a transmission shaft; a central control device producing commands for actuating of said gear shift devices from measured variables of said input and output speeds and including a synchronizing circuit arrangement producing digital control signals during super-synchronous, sub-synchronous and substantially synchronous running of the transmission shafts, and further including switching logic means comprising digitally operating switching and gating circuits, which selectively actuate said synchronizing aid means, gear shift devices and clutch means.

2. A system as claimed in claim 1, in which the synchronizing circuit arrangement includes two Schmitt triggers having different response and fall-out thresholds, means for producing variable signals whose values are indicative of the gear box input speed and the gear box output speed and for feeding said speed signals with opposite polarity to the input of each of the two Schmitt triggers, and matching means for matching the input and output speed signals in accordance with a gear to be engaged to bring them into a common range for comparison, said digital control signals being derived from the outputs of said Schmitt triggers.

3. A system as claimed in claim 2, which includes means whereby the two speed signals are transformed by a process including multiplication and addition to bring them into a common range before summing on the Schmitt triggers.

4. A system as claimed in claim 3, in which the matching means include an operational amplifier for each speed signal, and in which each operational amplifier comprises a differential amplifier having non-inverting and inverting inputs and serving to impart opposite polarities to said signals and to match the signals to one another in accordance with the gear to be engaged.

5. A system as claimed in claim 4 in which the matching means include voltage dividers associated with the individual speeds and means to selectively connect the voltage dividers to an input of the differential amplifier in accordance with the gear to be engaged.

6. A system as claimed in claim 2 in which the output signal of one of the two Schmitt triggers of the synchronizing circuit arrangement is inverted, and in which an OR gate is connected to the inverted output signal of the one Schmitt trigger and to the output of the other Schmitt trigger, whereby said digital control signals comprise the inverted output signal of said one Schmitt trigger, the output signal of the other Schmitt trigger and the output signal of the OR gate.

7. A system as claimed in claim 2, in which said means for producing variable signals indicative of the gear box input and output speeds comprise pulse generators with a pulse output train whose pulse frequency is proportional to speed, a monostable trigger circuit connected to each pulse generator and smoothing circuits comprising a low-pass filter for smoothing the output voltages of the monostable trigger circuits so that a direct current voltage proportional to the rotational speed may be taken from an output of each low-pass filter as the respective speed signal.

8. A system as claimed in claim 7, in which each said pulse generator comprises a toothed wheel and a proximity detector adapted to sense peripheral teeth of a respective toothed wheel.

9. A system as claimed in claim 7, in which said control device includes a pulse generator-failure safety device adapted to prevent a gear change operation in the event of failure of one of said pulse generators.

10. A system as claimed in claim 9 in which said pulse generator failure safety device comprises two pulse generator failure detectors, one connected to the output of each pulse generator, and gating circuitry connected to the outputs of the two pulse generator failure detectors, and circuit means adapted so that an output signal of said gating circuitry indicates a pulse generator failure and thereupon blocks a gear shift operation.

11. A system as claimed in claim 10, in which each pulse generator failure detector includes in a first branch the series combination of a delay circuit and a first Schmitt trigger, and in a second branch connected in parallel with the first branch a series combination of a second Schmitt trigger and an inverting stage and a NOR gate with two inputs, further characterized in that an input of the delay circuit and the input of the second Schmitt trigger are interconnected to form an input of a respective pulse generator failure detector device, the response threshold of said first Schmitt trigger being greater than the response threshold of said second Schmitt trigger, and the outputs of first Schmitt trigger and the inverting stage being connected respectively to the two inputs of the NOR gate on whose output appears a pulse upon detection of a pulse generator failure.

12. A system as claimed in claim 11, in which the response thresholds of said first and second Schmitt triggers and the time constant of the delay circuit are so chosen that an output signal is produced only at a predetermined rate of change of a falling input voltage at said respective detector input.

13. A system as claimed in claim 12, in which said control device includes a change-down blocking trigger stage for preventing a change-down in circumstances wherein the automobile engine would have to be oversped to achieve synchronization during change-down.

14. A system as claimed in claim 13 in which the change-down blocking trigger stage comprises a Schmitt trigger adapted to be triggered by a speed signal to produce an output signal for blocking a change-down operation in the gear box, the speed signal being dependent upon the anticipated speed of the engine upon change to a lower gear and the response threshold of the Schmitt trigger of the change-down blocking trigger stage being such that the Schmitt trigger is triggered when said anticipated speed reaches substantially the maximum speed of the engine.

15. A system as claimed in claim 14 including means for setting the response threshold of the last-mentioned Schmitt trigger of the change-down blocking trigger stage in accordance with a gear preselected, said speed signal being indicative of the gear box output speed.

16. A system as claimed in claim 15 in which switching transistors are provided for setting the response threshold of the last-mentioned Schmitt trigger of the change-down blocking trigger stage and are adapted to connect to the input of the Schmitt trigger a respective voltage divider which determines the response threshold of the Schmitt trigger of the change-down blocking trigger stage for each preselected gear.

17. A system as claimed in claim 16 in which the switching logic includes a selector switch position memory, a selector switch, and means interconnecting the two for storing gear change command signals as given by the selector switch.

18. A system as claimed in claim 17, comprising a mounting direction switching circuit, in which the selector switch position memory comprises bistable trigger stages forming a counter, each trigger stage having two complementary outputs, either of the two outputs of one bistable trigger stage being selectively connectible to the next following bistable trigger stage by means of the counting direction switching circuit.

19. A system as claimed in claim 18, comprising a decoding circuit, and gate circuits of the type of AND or NOR, in which the outputs of the bistable trigger stages forming the counter are connected to the decoding circuit which has a separate output terminal for each possible gear and wherein the number of said NOR gates or AND gates corresponds to the number of possible gears, each NOR gate or AND gate having a number of inputs corresponding to the number of trigger stages in the counter and connected to appropriate outputs of such trigger stages.

20. A system as claimed in claim 19 which includes blocking circuits and in which the selector switch position memory has an input for pulses for signalling a shift to a higher gear and an input for pulses for signalling a shift to a lower gear and in which said pulse inputs are connected to the counter by way of said blocking circuits which are connected to the decoding circuit and which serve to block a forward counting step in the counter beyond top gear and to block a backward counting step from a bottom gear.

21. A system as claimed in claim 20 which comprises negaters and an OR gate in which each of said blocking circuits comprises a NOR gate, the pulse inputs for gear shift being connected to first inputs of such NOR gates by way of respective negaters and the decoder output terminals for top and bottom gear being connected respectively to second inputs of such NOR gates and the outputs of the two NOR gates being connected to the counter by way of said OR circuit.

22. A system as claimed in claim 18, in which a monostable trigger stage, whose input is adapted to receive the gear-shift commands for changing to a higher gear or to a lower gear, is provided for triggering the first of the trigger stages forming the counter.

23. A system as claimed in claim 18 in which said counting direction switching circuit includes a change-over switch having two control inputs and two change-over outputs, each control input being adapted for switching the associated change-over output from logic 0 to logic 1 or vice versa, and in which one of the change-over outputs, for the purpose of effecting backward counting, is connected to first inputs of respective NOR gates each arranged between two bistable trigger stages of the counter second inputs of which NOR gates are connected by way of respective negaters to the output of the preceding bistable trigger stage, and the outputs of the NOR gates are connected respectively to first inputs of further NOR gates whose outputs are connected to the next following bistable trigger stage, and the other of said change-over outputs, for the purpose of effecting forward counting is connected via respective NOR gates similarly arranged between the bistable trigger stage to respective second inputs of said further NOR gates.

24. A system as claimed in claim 23, in which said change-over switch comprises a bistable trigger stage which is controllable only by means of setting input signals at its control inputs.

25. A system as claimed in claim 18 in which means are provided for setting the bistable trigger stages of the counter at zero automatically responsively to the switching on of the supply voltage for the entire control device.

26. A system as claimed in claim 17 in which the switching logic contains a gear box position memory for storing a signal indicative of the actual gear engaged in the gear box.

27. A system as claimed in claim 26 which includes gear box position switches, and in which the gear box position memory has inputs which are connectable to said gear box position switches which are located on the gear box, and outputs which comprise a signal and its inverted signal for each gear.

28. A system as claimed in claim 27, in which the gear box position memory contains a bistable trigger stage for each gear box position switch, one input of each bistable trigger stage being connectable to the respective gear box position switch, and the other inputs of the trigger stages being connected to the outputs of respective NOR gates and in which one input of each NOR gate is connectible to a gear box position switch and its other input is connected to a common lead which is itself connected to the output of a further NOR gate having one input for each gear box position switch and connectible thereto.

29. A system as claimed in claim 26 in which the switching logic includes a change-down monitoring circuit having logic circuitry, whose input signals comprise the output signals of the gear box and selector switch position memories and whose output signals indicate whether a change-down operation exists and can be carried out by reason of the travelling state, all permissible change-down conditions relating to the gear box position and the selector switch position being simulated by means of the logic circuitry in the change-down monitoring circuit.

30. A system as claimed in claim 29, which includes means connecting the output of the change-down blocking trigger stage to an input of the change-down monitoring circuit.

31. A system as claimed in claim 29 in which the change-down monitoring circuit is adapted to initiate at its output, when the gear box is in the neutral position, the apparance of a signal which enables a change-down operation to be effected.

32. A system as claimed in claim 31, in which the change-down monitoring circuit comprises a plurality of NOR gates so arranged and interconnected as to combine the input signals from the gear box and selector switch position memories to produce a predetermined pattern of output signals.

33. A system as claimed in claim 29, in which the switching logic further includes a gear-shift command generating circuit adapted to compare the position of the gear box position memory with the positions of the selector switch position memory for each gear and to block the production of gear-shift commands in dependence upon at least the output signal of the change-down monitoring circuit.

34. A system as claimed in claim 33 in which the gear-shift command generating circuit includes for each speed a NOR gate whose input signals are the positions of the gear box and selector switch position memories, and whose outputs together with at least the output of the change-down monitoring circuit are connected to an OR gate on the output of which appears information for carrying out the gear-shift command at the gear box.

35. A system as claimed in claim 34 in which the switching logic includes a gear-shift preselector stage whose input is connectible to a selector switch and whose output is connected to the gear-shift command generating circuit.

36. A system as claimed in claim 35, in which the gear-shift preselector stage includes a first OR gate whose inputs are connected to contacts of the selector switch for initiating a change to a higher gear and to a lower gear, and a second OR gate whose inputs are connected to a contact of the selector switch for initiating a change to the neutral position and to a preselection release contact.

37. A system as claimed in claim 36, in which the switching logic includes a starter blocking device which is responsive to signals indicative of the neutral positions of the gear box selector switch position memories, and to signals indicative of the position of the clutch, as ascertained by position contacts, for producing a signal for preventing operation of the engine starter except in appropriate circumstances.

38. A system as claimed in claim 37 for a vehicle with a clutch pedal which has a foot-operated contact for detecting when the clutch pedal is depressed and with a clutch which has a clutch position contact for detecting when the clutch is disengaged, in which said starter blocking device comprises a first NOR gate the inputs of which are connected to receive signals indicative of the neutral positions of the gear box and selector switch position memories, a second NOR gate with connecting means to connect inputs thereof to said pedal and clutch contacts, and a third NOR gate whose inputs are connected to the outputs of the first and second NOR gates and whose output provides the output signal of the starter blocking device.

39. A system as claimed in claim 1 for a vehicle, whose gear box includes hydraulic means for gear operation, said hydraulic means including a hydraulically operating gear-shift device having a hydraulic circuit supplied with hydraulic fluid by a pump unit, and in which said system includes a pressure switch for indicating a loss of pressure from the hydraulic circuit.

40. A system as claimed in claim 33 for a vehicle whose gear box comprises hydraulic means for gear operation, said hydraulic means including a hydraulically operating gear shift device provided with a pressurized hydraulic operating circuit fitted with hydraulic control valves and a pressure switch responsive to a pressure loss therein, in which said system further includes a pressure failure memory means having an output signal and inputs connectible to said pressure switch and to a clutch position contact for operating when the clutch is engaged, and having a further input connected to an output of the gear-shift command generating circuit, the output signal of said pressure failure memory means serving to prevent said hydraulic control valves from being operated.

41. A system as claimed in claim 40 in which the pressure failure memory means comprises a NOR gate whose first input is connected via a negater to the output of the gear-shift command generating circuit and whose second input is connected to another negater whose input is connectible to said clutch position switch for clutch engaged, and a bistable trigger stage a first of whose inputs is connected to the output of the NOR gate and a second of whose inputs is connectible to the pressure switch.

42. A system as claimed in claim 33 for a vehicle with a gear box having a hydraulically operating gear-shift device for engaging the individual gears, comprising: a disengaging valve which when actuated puts the gear box into the neutral position, gear-shift valves for engaging the individual gears, and in which the switching logic includes a gear-change circuit having inputs which are connected to the outputs of the selector switch position memory and the gear-shift command generating circuit for controlling the disengaging valve and the gear-shift valves.

43. A system as claimed in claim 42 in which outputs of the pulse generator are also connected to inputs of the gear change circuit which has a further input adapted to receive signals indicative of actuation of the clutch.

44. A system as claimed in claim 43, in which the gear-change circuit contains gate means to combine: the signals indicative of the state of the generator failure safety device, the state of the pressure failure memory, the position of the clutch, and the state of the gear-shift command generating circuit, so that the disengaging valve is actuated only when actuation thereof is admissible.

45. A system as claimed in claim 44 in which the switching logic is adapted to produce a first clutching signal for actuating the clutch and a second clutching signal for a clutching operation during a change-down operation, and in which the gear change circuit further contains a NOR gate whose inputs are connected to receive said clutching signals and whose output is connected to a further NOR gate together with the outputs of the generator failure safety device, the pressure failure memory and the gear-shift command generating circuit, the disengaging valve being connected to the output of said further NOR gate.

46. A system as claimed in claim 42 in which the gear-change circuit includes a timer for maintaining the gear-shift valves in their energized states longer than the disengaging valve.

47. A system as claimed in claim 46, in which the timer comprises a monostable trigger switch whose input is connected to the input for the disengaging valve by way of a negater and whose output is connected to a first input of a NOR gate a second input of which is also connected to the input for the disengaging valve.

48. A system as claimed in claim 47, in which the gear-change circuit includes a gear-shift valve control device which comprises an OR gate whose input signals constitute the output signals of the pressure failure memory and the timer, the output signal of an intermediate memory serving to prolong the neutral signal of the gear box position memory and the synchronous running signal, and whose output is connected to first inputs of NOR gates for controlling the individual gear-shift valves whose second inputs are connected to respective outputs of the selector switch position memory for the selected gears.

49. A system as claimed in claim 48 in which said intermediate memory comprises a bistable trigger stage, one setting input of which is connected to the output of the timer and the other setting input of which is connected to the output of a NOR gate whose inputs comprise the output of the gear-shift command generating circuit, the negated input for the disengaging valve, and the negated neutral signal of the gear box position memory.

50. A system as claimed in claim 1 in which the clutch means is hydraulically actuated and in which the switching logic means includes a clutch actuating circuit for controlling a hydraulic valve for rapidly operating the clutch and a hydraulic valve for slow engagement of the clutch.

51. A system as claimed in claim 50 in which the clutch actuating circuit contains a first NOR gate, whose output controls the hydraulic valve for rapidly operating the clutch and whose inputs are connected to the generator failure safety device, a clutch foot-operated contact, the pressure failure memory, the gear-shift command generating circuit, a signal source for reengagement of the clutch during change to a lower gear and a signal source for indicating whether the vehicle is moving, and a second NOR gate whose output controls a hydraulic valve for slow engagement of the clutch and whose inputs are connected to the output of the first NOR gate, the clutch foot-operated contact, the pressure failure memory, the output of the selector switch position memory for the neutral signal, a clutch position contact and the signal source for reengagement of the clutch during change to a lower gear.

52. A system as claimed in claim 51 including a timer in which the output of the second NOR gate is connected to the timer whose output provides a delayed signal after the signal appears at the output of the second NOR gate, the output of the timer being connectible to the hydraulic valve for slowly actuating the clutch.

53. A system as claimed in claim 1 in which the synchronizing aids include at least one of a lay shaft brake and an engine brake and also include an engine accelerating device, in which the switching logic means includes a synchronizing aids control circuit adapted to control the synchronizing aids in dependence upon synchronizing signals, signals for the neutral position of the gear box and clutch position signals, whereby the lay shaft brake and the engine brake, as the case may be, are actuated when changing to a higher gear and the engine accelerating device is actuated when changing to a lower gear.

54. A system as claimed in claim 1, in which the automobile engine is fitted with a fuel regulator, and in which the switching logic includes a synchronizing aids control circuit adapted to so control the fuel regulator during a gear change operation that, irrespective of the position of the accelerator pedal, the speed of the engine is reduced when changing to a higher gear and increased when changing to a lower gear.

55. A system as claimed in claim 54, wherein the fuel regulator is an electronic fuel regulator for regulating the fuel quantity delivered to the engine.

56. A system as claimed in claim 53 in which the synchronizing circuit contains a NOR gate whose output signal serves to control the lay shaft and whose inputs comprise the neutral signal of the selector switch position memory, negated super-synchronous and sub-synchronous running signals of the synchronizing circuit arrangement, the output signal of the gear-shift command generating circuit, the system also including means for producing a negated signal indicative of the clutch being disengaged, and means for producing a signal for signalling the clutch to re-engage during change to a lower gear.

57. A system as claimed in claim 56 in which said synchronizing aids control circuit includes said means for producing a signal for signalling the clutch to re-engage during change to a lower gear, which means comprises a bistable trigger stage at whose output such signal appears and which serves as an intermediate memory, the input of said intermediate memory being connected the output of a NOR gate to whose inputs are connected the output of the gear-shift command generating circuit, the neutral signal output of the gear box position memory, and the negated super-synchronous and sub-synchronous running signal outputs of the syncrhonizing circuit arrangement, and the reset input of said intermediate memory being connected to an output of an OR gate whose inputs are connected to the synchronous running signal output of the synchronizing circuit arrangement, the output signal of the gear-shift command generating circuit, and a signal output adapted to indicate movement of the vehicle.

58. A system as claimed in claim 57 in which the synchronizing aids control circuit includes a NOR gate whose output serves to control the engine brake and whose inputs are connected to the neutral signal output of the selector switch memory, the output of the gear-shift command generating circuit, the synchronous running signal output of the synchronizing circuit arrangement, a signal output adapted to indicate movement of the vehicle, and a negated signal output adapted to indicate that the clutch is disengaged.

59. A system as claimed in claim 58, in which the synchronizing aids control circuit is adapted to produce a signal for preventing the engine brake from being arbitrarily actuated by the driver during a gear change operation.

60. A system as claimed in claim 58 in which the synchronizing aids control circuit includes a negater for negating the output signal of the gear-shift command generating circuit to produce a signal for preventing the engine brake from being arbitrarily actuated by the driver during a gear change operation.

61. A system as claimed in claim 60 for a vehicle whose engine is fitted with an electronic fuel regulator, in which the synchronizing aids control circuit is adapted to produce two signals for the electronic fuel regulator, the first of which signals serves to initiate an increase in the speed of the automobile engine irrespective of the position of the accelerator pedal, and the second of which serves to effect a decrease in the speed of the engine when the first signal is simultaneously present.

62. A system as claimed in claim 61 in which the synchronizing aids control circuit includes an OR gate whose output provides the first signal for the electronic fuel regulator one input of which is the signal output for actuating the engine brake and another input of which is the output of a NOR gate to whose inputs are connected the neutral signal output of the selector switch position memory, the output of the gear-shift command generating stage, the negated sub-synchronous running signal output of the synchronizing circuit arrangement, and the output of a further NOR gate, whose inputs are connected to the signal output for re-engaging the clutch when changing to a lower gear and a signal output for indicating that the clutch is disengaged.

63. A system as claimed in claim 62 in which the synchronizing aids control circuit is adapted to control a switching device which serves to render arbitrary actuation of the accelerator pedal and the clutch pedal by the driver ineffective and to render the vehicle control fully automatic during gear change.

* * * * *